US012617270B2

(12) United States Patent
Morselli

(10) Patent No.: US 12,617,270 B2
(45) Date of Patent: May 5, 2026

(54) GEARBOX FOR A FRONT AXLE OF AN ELECTRIC TRACTOR

(71) Applicant: Dana Motion Systems Italia S.R.L., Reggio Emilia (IT)

(72) Inventor: Riccardo Morselli, Modena (IT)

(73) Assignee: DANA MOTION SYSTEMS ITALIA S.R.L., Reggio Emilia (IT)

( * ) Notice: Subject to any disclaimer, the term of this patent is extended or adjusted under 35 U.S.C. 154(b) by 204 days.

(21) Appl. No.: 18/440,104

(22) Filed: Feb. 13, 2024

(65) Prior Publication Data

US 2024/0300326 A1      Sep. 12, 2024

Related U.S. Application Data

(60) Provisional application No. 63/495,062, filed on Apr. 7, 2023, provisional application No. 63/489,678, filed on Mar. 10, 2023.

(51) Int. Cl.
*B60K 1/02* (2006.01)
*B60K 17/02* (2006.01)
(Continued)

(52) U.S. Cl.
CPC .............. *B60K 17/356* (2013.01); *B60K 1/02* (2013.01); *B60K 17/02* (2013.01); *B60K 17/08* (2013.01);
(Continued)

(58) Field of Classification Search
CPC ........ B60K 17/356; B60K 1/02; B60K 17/02; B60K 17/08; B60K 17/16; B60K 17/28; B60K 25/00; B60K 2025/005; B60K 17/344; B60K 1/00; F16H 37/0806; F16H 37/0813; F16H 59/42; F16H 61/0403; F16H 61/682; F16H 63/502; F16H 2061/0422; F16H 2200/0004; F16H 2200/0017;

(Continued)

(56) References Cited

U.S. PATENT DOCUMENTS 8,986,148 B2    3/2015  Downs et al.
9,067,493 B2    6/2015  Husson et al.
(Continued)

FOREIGN PATENT DOCUMENTS

CN        111483307 A  *  8/2020  ............. B60K 17/06
CN        212775407 U     3/2021
(Continued)

*Primary Examiner* — Justin Holmes
(74) *Attorney, Agent, or Firm* — McCoy Russell LLP

(57) ABSTRACT

Systems and methods are provided for electrifying a drivetrain of a vehicle. In one example, a gearbox for a vehicle a first gear coupled to a first input shaft configured to be driven by a first electric motor, a second gear configured to mesh with the first gear, and a third gear configured to mesh with the second gear and coupled to a third shaft configured to drive a first axle of the vehicle and connectable to a second axle of the vehicle. The gearbox further includes a fourth gear coupled to the first input shaft, a fifth gear coupled to a lay shaft coupled to the second gear, a sixth gear coupled to a second input shaft, and a seventh gear coupled to a power takeoff shaft configured to drive one or more power takeoff units, the second input shaft configured to be driven by a second electric motor.

19 Claims, 17 Drawing Sheets

(51) Int. Cl.

| | |
|---|---|
| *B60K 17/08* | (2006.01) |
| *B60K 17/16* | (2006.01) |
| *B60K 17/28* | (2006.01) |
| *B60K 17/356* | (2006.01) |
| *B60K 25/00* | (2006.01) |
| *F16H 37/08* | (2006.01) |
| *F16H 59/42* | (2006.01) |
| *F16H 61/04* | (2006.01) |
| *F16H 61/682* | (2006.01) |
| *F16H 63/50* | (2006.01) |

(52) U.S. Cl.
CPC .............. *B60K 17/16* (2013.01); *B60K 17/28* (2013.01); *B60K 25/00* (2013.01); *F16H 37/0806* (2013.01); *F16H 37/0813* (2013.01); *F16H 59/42* (2013.01); *F16H 61/0403* (2013.01); *F16H 61/682* (2013.01); *F16H 63/502* (2013.01); *B60K 2025/005* (2013.01); *F16H 2061/0422* (2013.01); *F16H 2200/0004* (2013.01); *F16H 2200/0017* (2013.01); *F16H 2200/0021* (2013.01); *F16H 2200/0034* (2013.01)

(58) Field of Classification Search
CPC ..... F16H 2200/0021; F16H 2200/0034; F16H 3/089; B60Y 2200/221; Y02T 10/62
See application file for complete search history.

(56) References Cited

U.S. PATENT DOCUMENTS

| | | | | |
|---|---|---|---|---|
| 11,590,960 | B2 * | 2/2023 | Kaltenbach | ............. F16H 3/006 |
| 2022/0128139 | A1 | 4/2022 | Engerman | |

FOREIGN PATENT DOCUMENTS

| | | | | | |
|---|---|---|---|---|---|
| CN | 115789184 | A | * | 3/2023 | ............... B60K 1/02 |
| DE | 102017205149 | A1 | | 9/2018 | |
| RU | 2782852 | C1 | * | 11/2022 | |
| WO | WO-2023031206 | A1 | * | 3/2023 | ............. B60K 17/26 |

* cited by examiner

GEARBOX FOR A FRONT AXLE OF AN ELECTRIC TRACTOR

RELATED APPLICATIONS

The present application claims priority to U.S. Provisional Application No. 63/495,062, entitled "GEARBOX FOR A FRONT AXLE OF AN ELECTRIC TRACTOR," and filed Apr. 7, 2023. The present application also claims priority to U.S. Provisional Application No. 63/489,678, entitled "GEARBOX FOR A FRONT AXLE OF AN ELECTRIC TRACTOR," and filed Mar. 10, 2023. The entire contents of each of the above-identified applications is hereby incorporated by reference for all purpose.

TECHNICAL FIELD

The present description relates generally to a gearbox in a vehicle. More specifically, the present disclosure relates to a gearbox for an axle of an electric tractor.

BACKGROUND AND SUMMARY

Many agricultural tractors in use today are powered solely by an internal combustion engine. Replacing agricultural tractors solely powered by internal combustion engines with electric tractors has the potential to reduce the constant maintenance, noise and pollution associated with gas and diesel tractors. Additionally, electric tractors may require less upkeep than tractors employing internal combustion engines, which may reduce the repair time and cost required to keep the tractor running. Further, electric motors may produce higher torque at lower speed than internal combustion engines, which may be ideal for tractor operation.

Agricultural tractors may be electrified through the front axle. However, the inventors herein have recognized potential issues with such a system. The utilization of an electric motor to drive the front axle of the tractor may make it difficult to install a four-wheel-drive shaft and may require larger front brakes than is standard. Further, a front installation of a power takeoff may require the electric motor to be positioned lower in the tractor, which may require a lower ground clearance for the tractor. Additionally, there may be a large speed difference (e.g., 4000+ rpm) between the electric motor and a pinion gear that transfers power from a drive shaft to a differential unless the motor is oversized.

In one example, the issues described above may be addressed by a gearbox for a vehicle, where the gearbox includes a first gear coupled to a first input shaft, the first input shaft configured to be driven by a first electric motor of the vehicle, a second gear configured to mesh with the first gear; and a third gear configured to mesh with the second gear and coupled to a third shaft, the third shaft configured to drive a first axle of the vehicle and connectable to a second axle of the vehicle, wherein the first gear, the second gear, and the third gear form a first gear set. The gearbox further includes a second gear set comprising a fourth gear coupled to the first input shaft and a fifth gear coupled to a lay shaft, the lay shaft coupled to the second gear, and a third gear set comprising a sixth gear coupled to a second input shaft and a seventh gear coupled to a power takeoff shaft, the power takeoff shaft configured to drive one or more power takeoff units, the second input shaft configured to be driven by a second electric motor.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
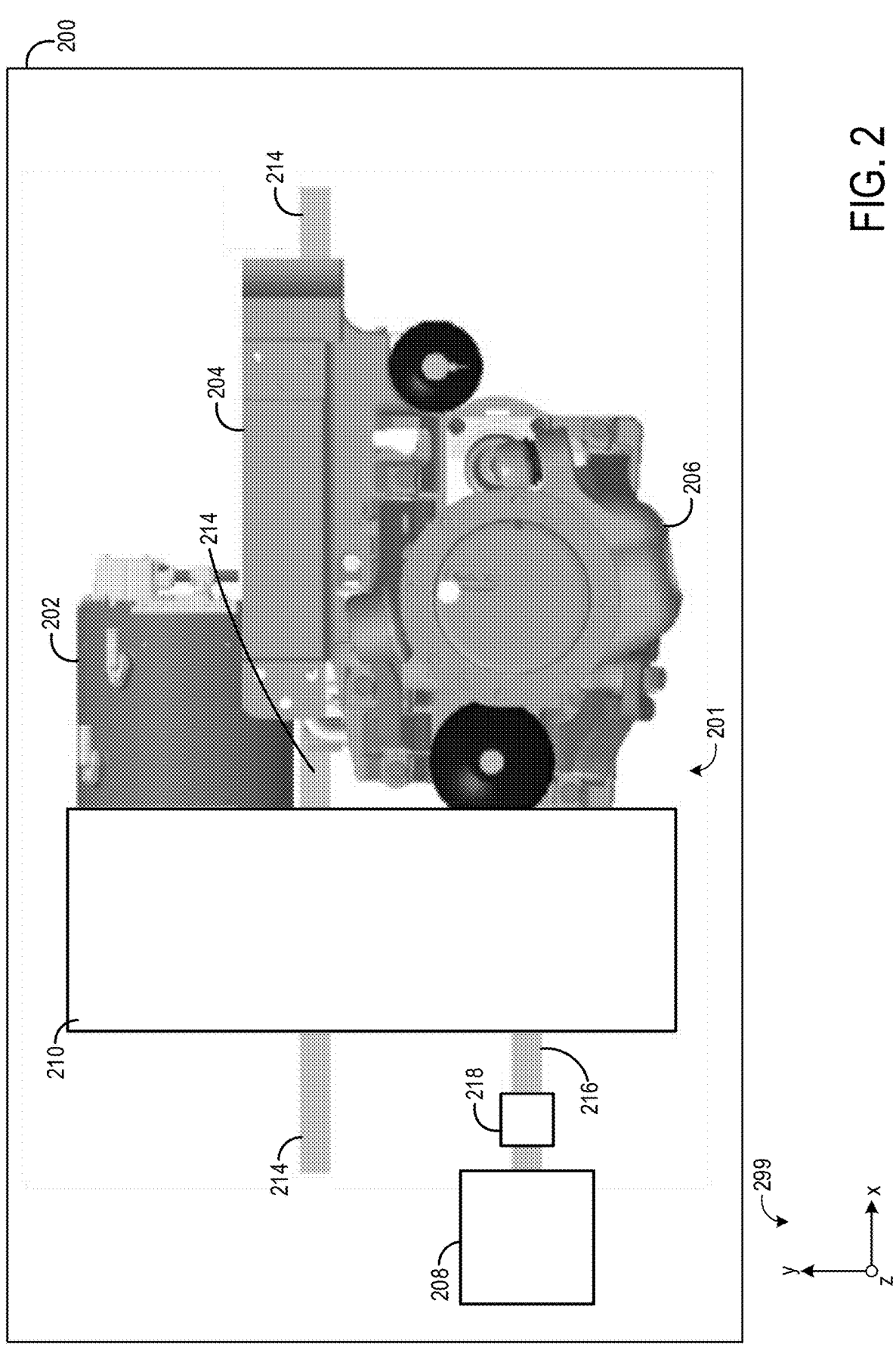
FIG. 2 is a side view of a gearbox coupled to an electric motor, a power takeoff, a front differential, and a rear differential.
Figure 3:
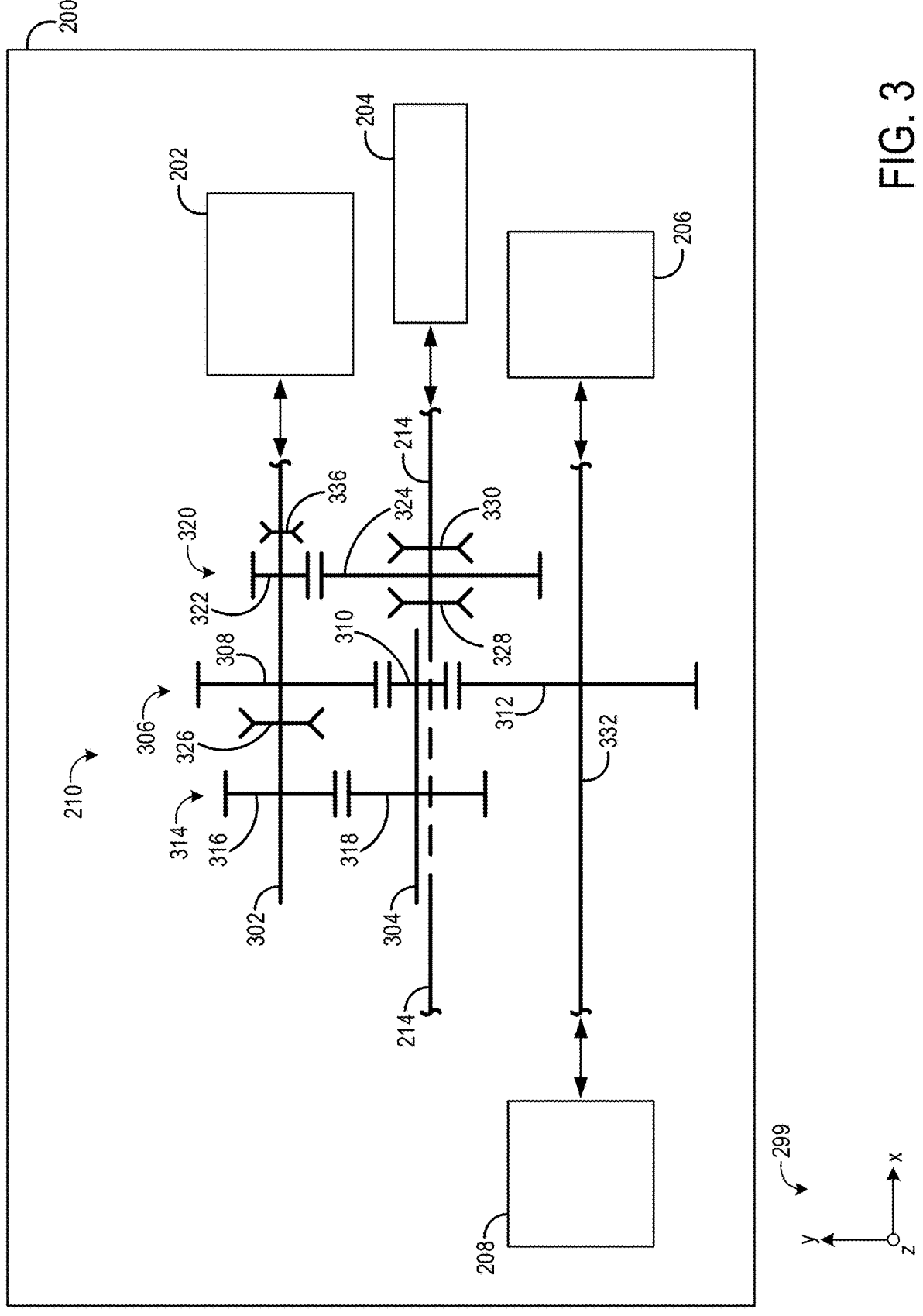
FIG. 3 is a schematic diagram of the gearbox of FIG. 2 with the electric motor of FIG. 2 in a first position.
Figure 4:
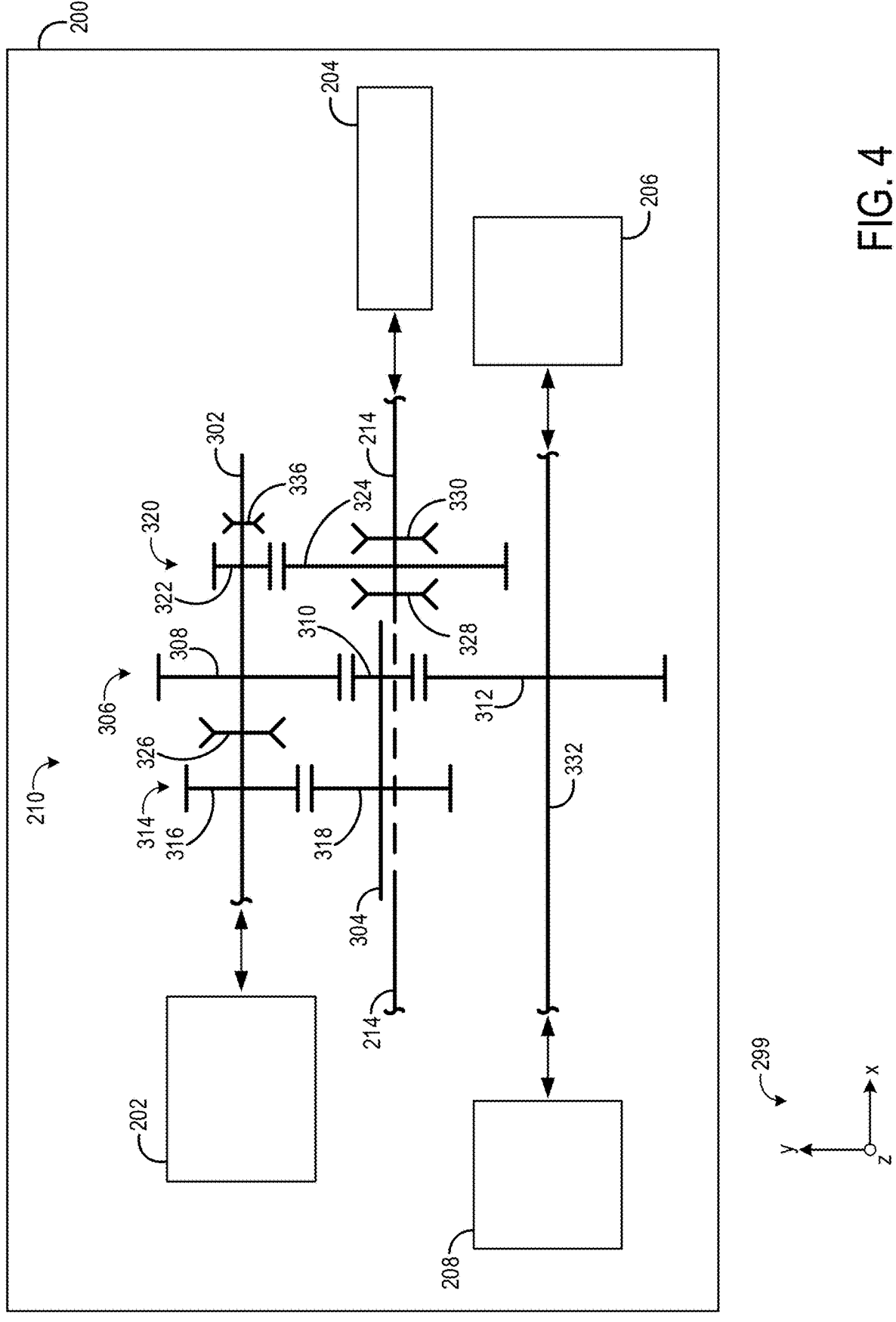
FIG. 4 is a schematic diagram of the gearbox of FIG. 2 with the electric motor of FIG. 2 in a second position.
Figures 6A, 6B:
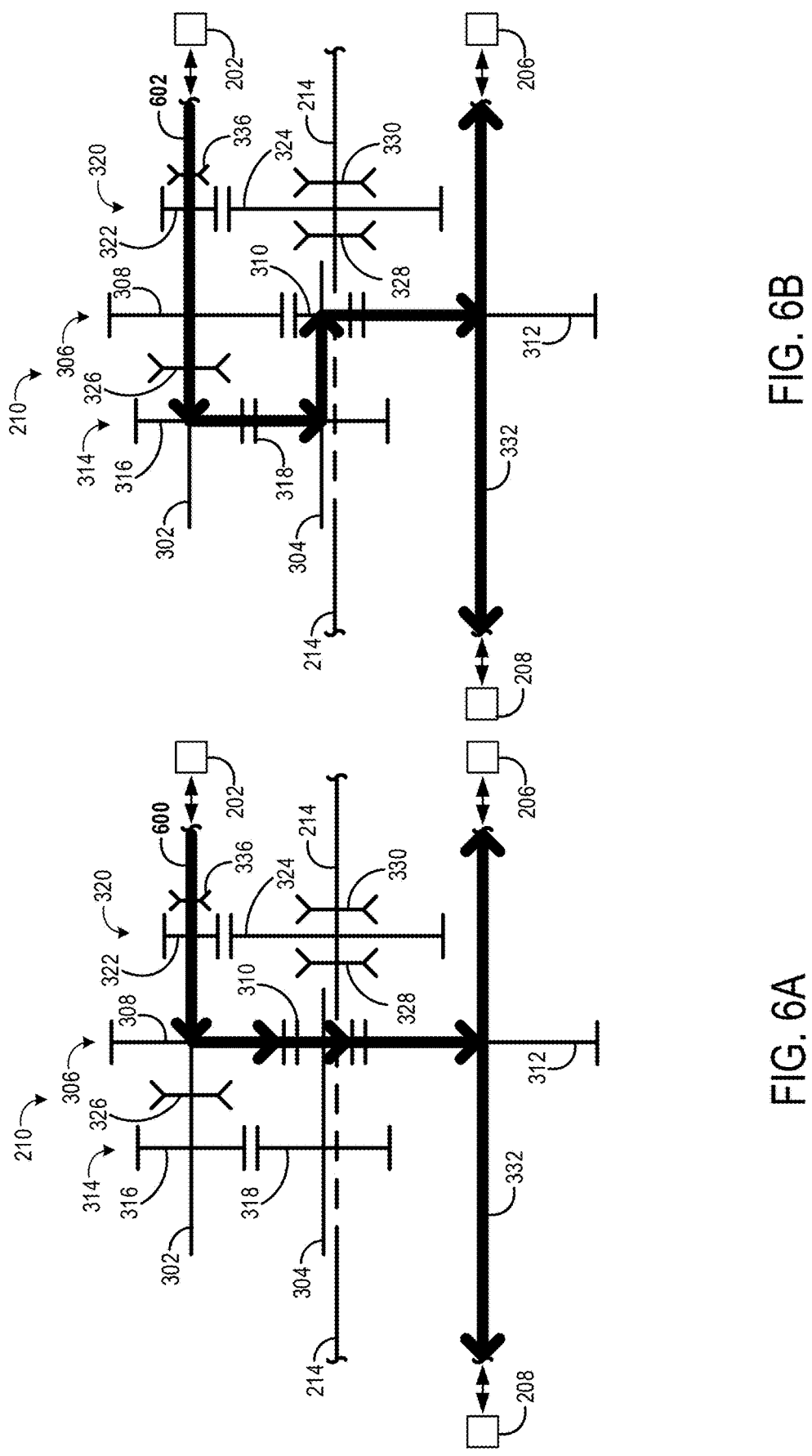
FIG. 6A is a schematic diagram of a power path that occurs in the gearbox of FIG. 2 during a first gear stage.
FIG. 6B is a schematic diagram of a power path that occurs in the gearbox of FIG. 2 during a second gear stage.

The following description relates to a gearbox for an electric vehicle. The vehicle, such as the vehicle shown by FIG. 1, may be an agricultural tractor or another suitable off-road vehicle, such as a combine, baler, front-end loader, backhoe, etc. Further, the vehicle may include a gearbox, such as the gearbox shown by FIGS. 2-4. In some examples, the gearbox may be coupled to an electric motor, an output shaft, and a power takeoff shaft, as shown in FIG. 2. The gearbox may include multiple sets of gears and a plurality of disconnect devices. The gears and disconnect devices may be arranged as shown in FIGS. 3 and 4. The gearbox may allow the electric motor to drive a front differential and/or a rear differential via a transfer of mechanical energy, as shown in FIGS. 6A and 6B. Additionally, the gearbox may allow the electric motor to permanently and/or temporarily connect to the power takeoff during vehicle operation. Mechanical energy may be transferred between the electric motor, the power takeoff, and a secondary power source as shown in FIGS. 7A-7D. A method for shifting the gearbox from a first gear stage to a second gear stage and for operating the power take off is shown in FIG. 8.

Figure 9:
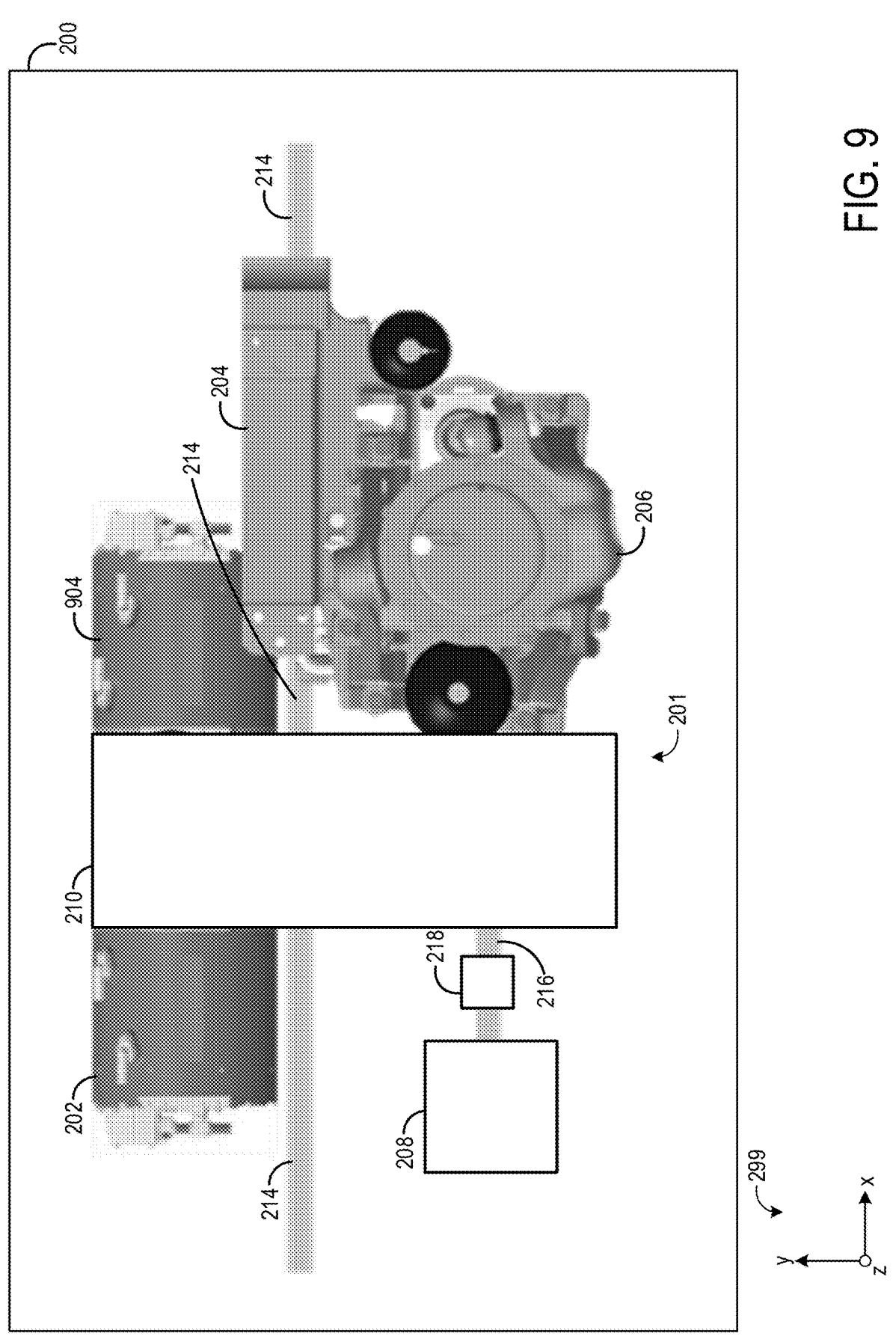
FIG. 9 is a side view of a gearbox coupled to a first electric motor, a second electric motor, a power takeoff, a front differential, and a rear differential.
Figure 10:
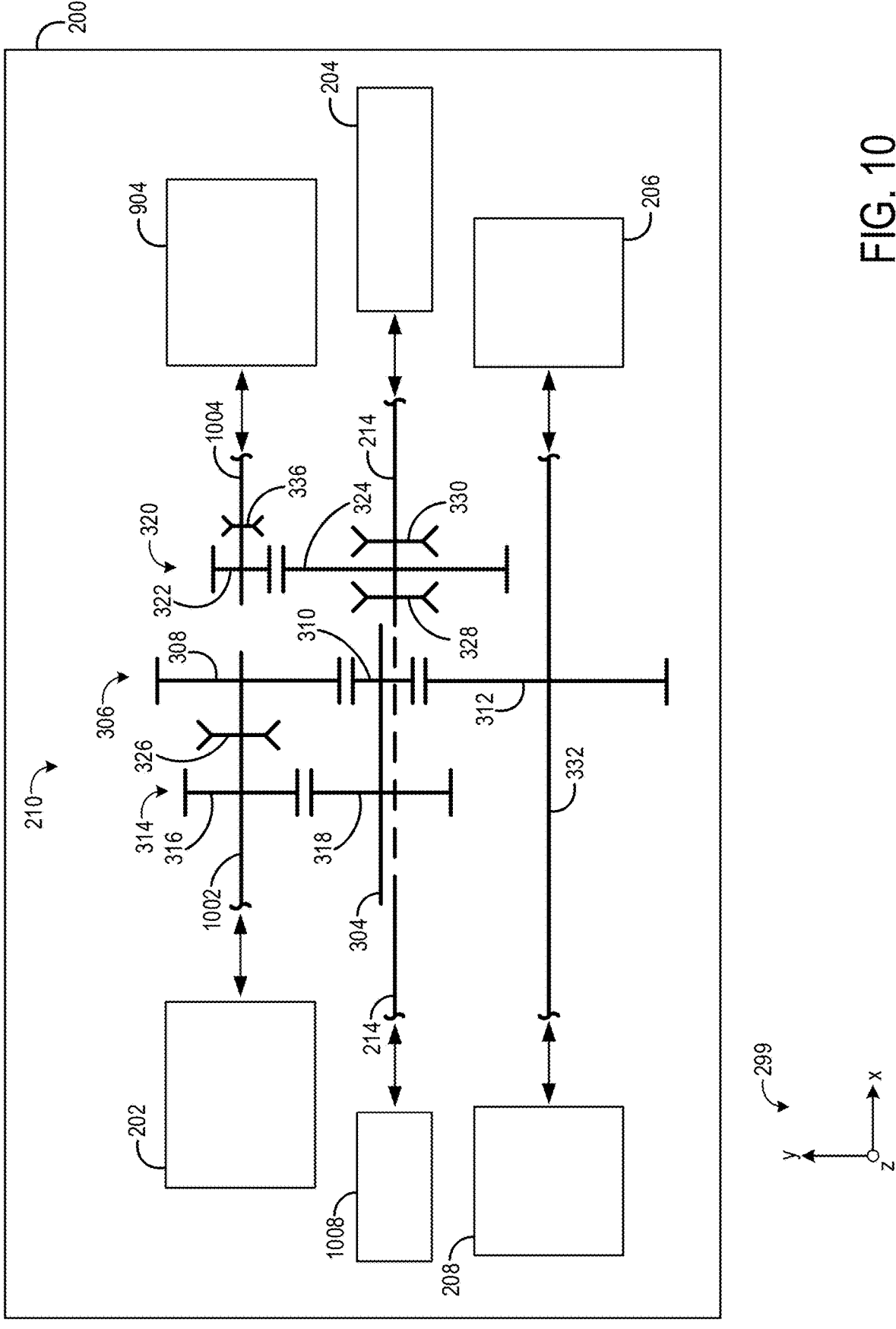
FIG. 10 is a schematic diagram of the gearbox of FIG. 9.
Figures 11A, 11B:
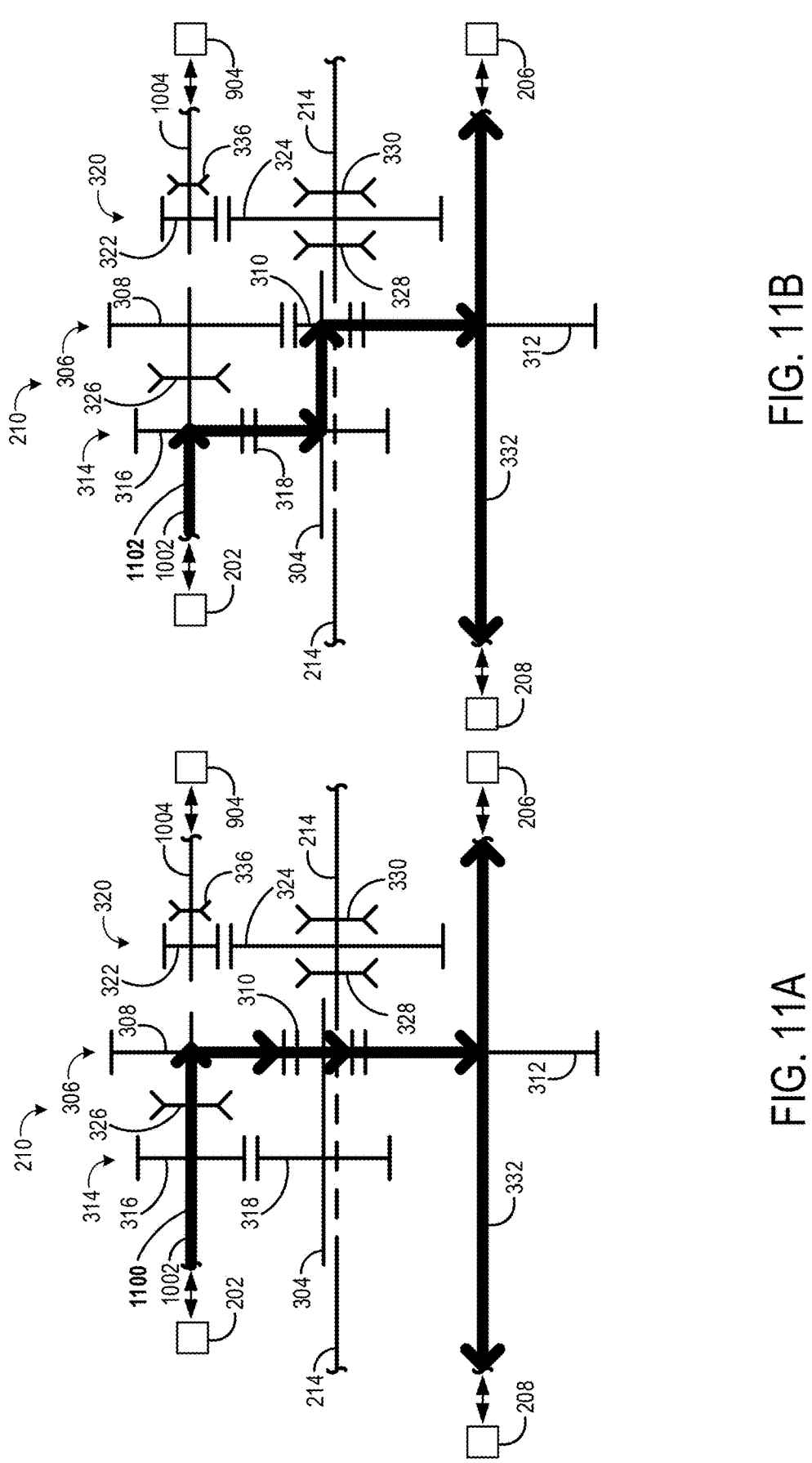
FIG. 11A is a schematic diagram of a power path that occurs in the gearbox of FIG. 9 during a first gear stage.
FIG. 11B is a schematic diagram of a power path that occurs in the gearbox of FIG. 9 during a second gear stage.
Figure 12A:
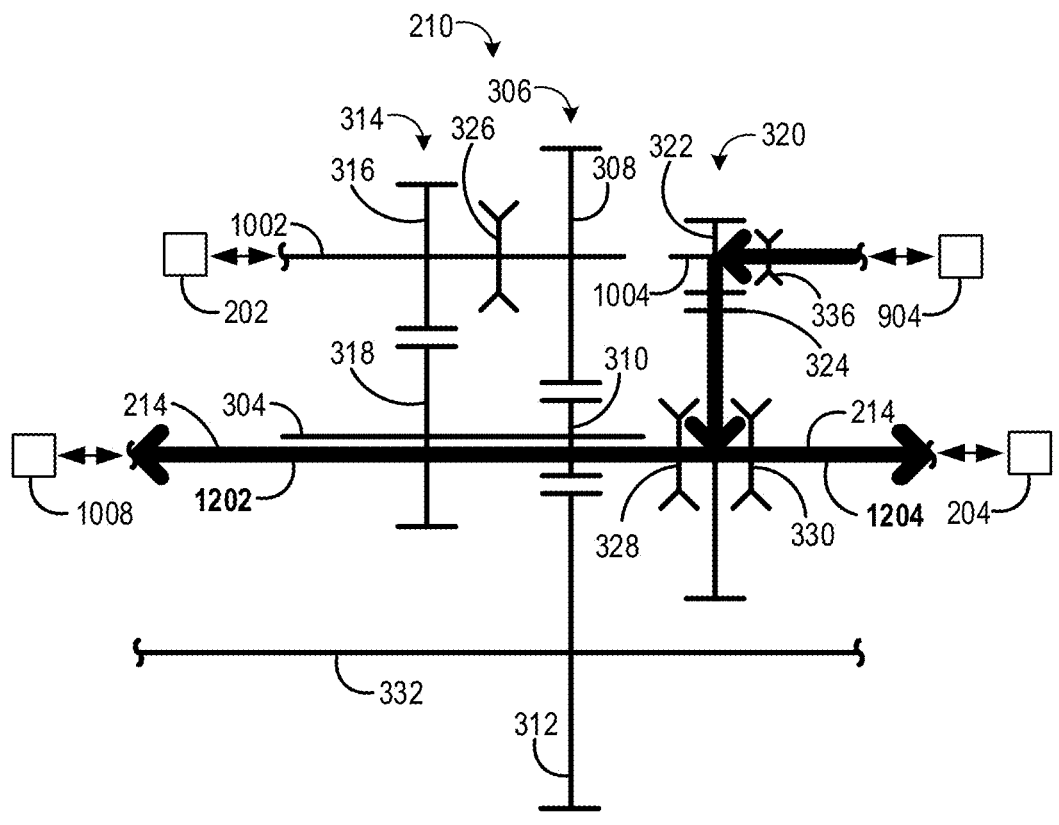
FIG. 12A is a schematic diagram of a power path that occurs in the gearbox of FIG. 9 when the power takeoff and a second power takeoff are driven by the second electric motor.
Figure 12B:
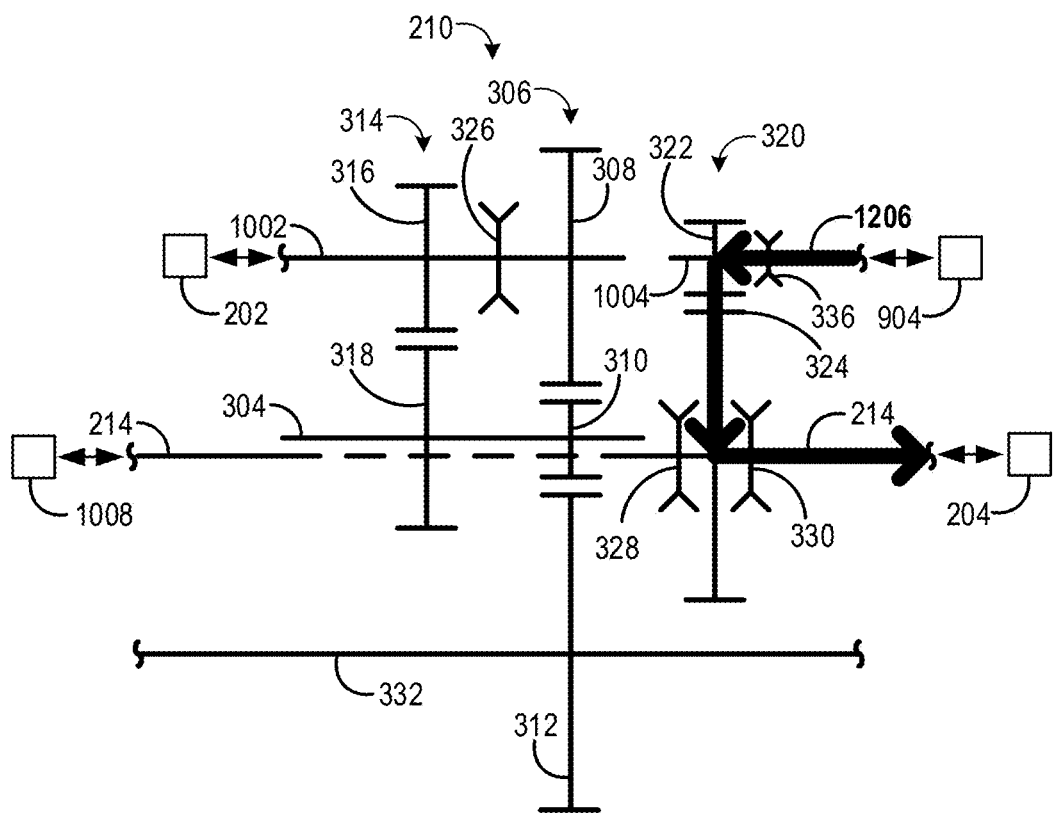
FIG. 12B is a schematic diagram of a power path that occurs in the gearbox of FIG. 9 when the power takeoff is driven by the second electric motor.
Figure 12C:
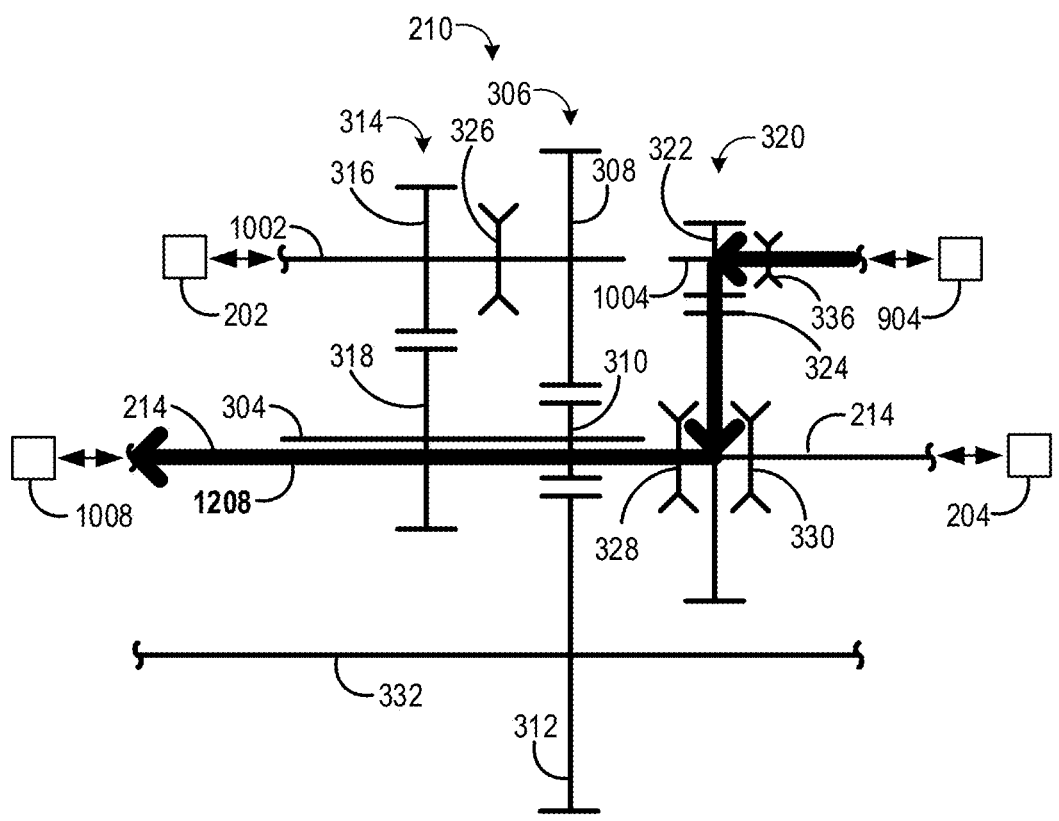
FIG. 12C is a schematic diagram of a power path that occurs in the gearbox of FIG. 9 when the second power takeoff is driven by the second electric motor.

In other examples, the gearbox may be coupled to a first electric motor, a second electric motor, an output shaft, and a power takeoff shaft, as shown in FIG. 9. The gearbox may include multiple sets of gears and a plurality of disconnect devices. The gears and disconnect devices may be arranged as shown in FIG. 10. The gearbox may allow the first electric motor to drive a front differential and/or a rear differential via a transfer of mechanical energy, as shown in FIGS. 11A and 11B. Additionally, the gearbox may allow the second electric motor to permanently and/or temporarily connect to the power takeoff during vehicle operation. Mechanical energy may be transferred between the second electric motor and the power takeoff as shown in FIGS. 12A-12C.

Figure 1:
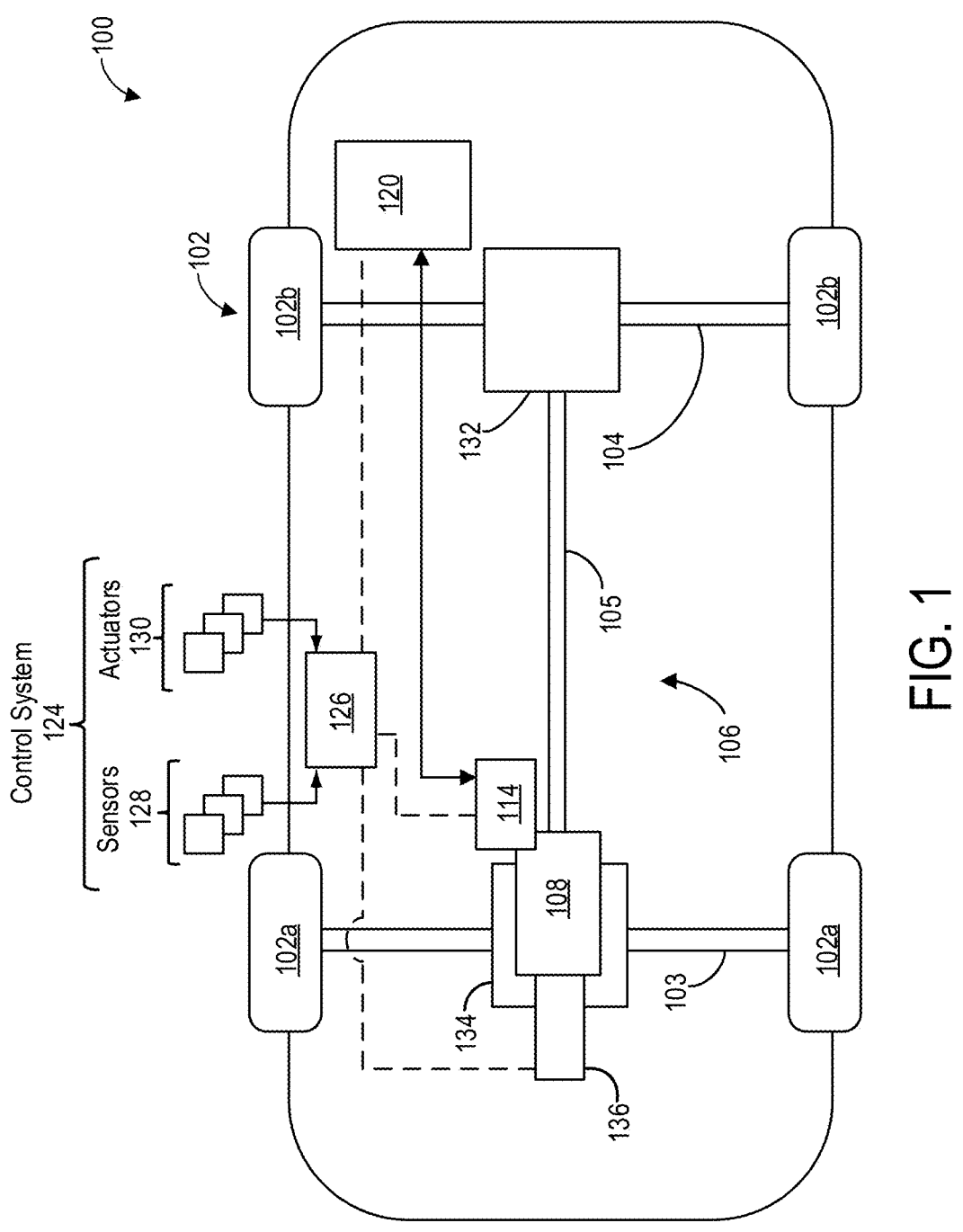
FIG. 1 is a schematic diagram of a vehicle including an electric motor and a gearbox.

Referring to FIG. 1, a schematic representation of a vehicle 100 is depicted. It will be appreciated that a vehicle 100 is shown in FIG. 1 for illustrative purposes and is a non-limiting example of how a vehicle may be configured. Other examples may include variations in arrangements and positioning of vehicle components depicted in FIG. 1, as well as additional components not shown in FIG. 1. In some examples, the vehicle 100 may be an all-electric vehicle (EV). In other examples, the vehicle 100 may be a hybrid electric vehicle (HEV). Further, in some examples, the vehicle 100 may be an off-road four-wheel-drive vehicle, such as an agricultural tractor.

The vehicle 100 may include a plurality of wheels 102, comprising front wheels 102a and rear wheels 102b, with the front wheels 102a coupled by a front axle 103 and the rear wheels 102b coupled by a rear axle 104. In some examples, the front axle 103 may be an electrified front axle. As shown in FIG. 1, the vehicle 100 may be configured with four-wheel drive. In some examples, the vehicle 100 may be configured with front-wheel drive or all-wheel drive.

A drive train 106 of the vehicle 100 may include a transmission 108 (e.g., a gearbox, gear train, etc.) configured to receive torque input from a rotating source and output torque to a drive shaft 105. In some examples, the rotating source may be an electric machine 114. In other examples, the vehicle 100 may have more than one rotating source, such as the electric machine 114 and an internal combustion engine (e.g., in a hybrid electric vehicle) or the electric machine 114 and a secondary electric motor (e.g. in a fully electric vehicle). In yet other examples, at least one additional electric machine may be incorporated. In some examples, the electric machine 114 may be a motor-generator, with a capacity to convert electrical energy into mechanical energy and vice versa. As such, the electric machine 114 may be electrically coupled to a traction battery 120 of vehicle 100 to both draw power from the traction battery 120 and to generate electrical energy to be stored at the traction battery 120.

The transmission 108 may couple to a front differential 134, which is engaged by the transmission 108 to output torque. The output torque may be moderated based on selective adjustments to gear engagement at the transmission 108 to accommodate desired vehicle operation. Rotation of an output shaft of the transmission 108 may drive rotation of various gears, such as side gears, pinion gears, etc., of the front differential 134, which is transferred to rotation of the front axle 103. Further, the drive shaft 105 may extend between the transmission 108 and a rear differential 132. As such, the output torque of the drive shaft 105 may drive rotation of various gears, such as side gears, pinions, etc., of the rear differential 132, which is transferred to rotation of the rear axle 104. In this way, the transmission 108 may transmit torque output from the rotating source (e.g., the electric machine 114) to the plurality of wheels 102 (e.g., the front wheels 102a and the rear wheels 102b) to enable vehicle motion.

The vehicle 100 may include a power takeoff 136. In some examples, the power takeoff 136 may be engaged by the transmission 108 to output torque via a power takeoff shaft. Rotation of the power takeoff shaft within the power takeoff 136 may drive rotation of matched equipment at the front of the vehicle, such as a cooling fan, a mower, a harvester, a ditcher, a fertilizer box, and the like. In other examples, the power takeoff 136 may include a generator that may generate electricity (via rotational energy supplied by the electric motor or the secondary power source) that is supplied to an external electrical consumer, such as one of the implements mentioned above (e.g., cooling fan, mower, harvester, etc.). In still further examples, additionally or alternatively, an electric power takeoff may be included, where an external implement may be operated via electricity generated by the electric motor. In this way, the transmission 108 may transmit torque output from the rotating source (e.g., the electric machine 114) to the power takeoff 136. In some examples, additionally or alternatively, the power takeoff 136 may derive torque from a secondary power source, such as a second electric motor, an internal combustion engine, or the drive wheels of the vehicle 100.

The vehicle 100 may further include a control system 124, including a controller 126, sensors 128, and actuators 130. The controller 126 may be a microcomputer, including elements such as a microprocessor unit, input/output ports, an electronic storage medium for executable programs and calibration values, e.g., a read-only memory chip, random access memory, keep alive memory, and a data bus. In one example, the controller 126 may be a powertrain control module (PCM).

The controller 126 may receive various signals from the sensors 128 coupled to various regions of the vehicle 100. For example, the sensors 128 may include position sensors coupled to the transmission 108, engine sensors for monitoring engine speed, temperature, air mass flow, etc., sensors coupled to the traction battery 120 for measuring a battery state of charge and temperature, sensors coupled to the electric machine 114 for monitoring a status of the electric machine 114, and sensors coupled to the power takeoff 136 for monitoring a status of the power takeoff 136. Upon receiving the signals from one or more of the sensors 128 of FIG. 1, the controller 126 processes the received signals, and employs one or more of the actuators 130 of the vehicle 100 to adjust engine, electric machine, and/or drive train operations based on the received signals as well as instructions stored at a memory of the controller 126.

While FIG. 1 shows an electrified front axle, with the transmission coupled to the front differential, the vehicle may instead include an electrified rear axle, with the transmission coupled to the rear differential.

FIGS. 2-5, 9, and 10 include a Cartesian coordinate system 299 to orient the views. The y-axis may be a vertical axis (e.g., parallel to a gravitational axis), the x-axis may be a longitudinal axis (e.g., horizontal axis), and/or the z-axis may be a lateral axis, in one example. However, the axes may have other orientations, in other examples. A filled circle may represent an arrow and axis facing toward, or positive to, a view. An unfilled circle may represent an arrow and an axis facing away, or negative to, a view.

FIG. 2 shows a gearbox 210 that may be included in a vehicle 200. The vehicle 200 and the gearbox 210 may be non-limiting examples of the vehicle 100 and the transmission 108 of FIG. 1, respectively. In some examples, the gearbox 210 may be a multi-speed electric gearbox, and may be included in an electric powertrain 201 of the vehicle 200. The electric powertrain 201 may specifically be an all-electric powertrain or the electric powertrain 201 may be a hybrid electric powertrain. An all-electric powertrain may be used due to its reduced complexity and therefore reduced points of potential component degradation in comparison to a hybrid electric powertrain.

The electric powertrain 201 may include an electric motor 202 (e.g., a traction motor). In some examples, the electric motor 202 may be electrically coupled to an inverter (not shown) via an electrical connection (e.g., multi-phase wires, bus bars, combinations thereof, and the like). The electric motor 202 may be of any known motor technology, and in some examples may be an alternating current (AC) type motor. To elaborate, the electric motor 202 may be a multi-phase (e.g., three, six, or nine phase) AC motor. In some examples, the electric motor 202 may be a three-phase AC motor that is less costly and more efficient than single-phase type motors. However, in other examples, the electric motor 202 may be a direct current (DC) traction motor.

The electric powertrain 201 may include a front differential 206 and a rear differential 208 that are mechanically coupled via a drive shaft 216 and the gearbox 210. The gearbox 210 may include three shafts: a first shaft, a second shaft, and a third shaft. The third shaft of the gearbox 210 may be referred to as an output shaft or the drive shaft 216. The front differential 206 may be mechanically connected to the output shaft of the gearbox 210 via a U-joint or another suitable mechanical connector. The front differential 206 may be a part of a front drive axle assembly, where the front drive axle assembly may include the front differential 206, axle shafts (e.g., half shafts) coupled to the front differential 206, drive wheels coupled to the axle shafts, and the like. Similarly, the rear differential 208 may be a part of a rear drive axle assembly, where the rear drive axle assembly may include the rear differential 208, axle shafts (e.g., half shafts) coupled to the rear differential 208, drive wheels coupled to the axle shafts, and the like. The drive wheels may be mounted on wheel hubs and may contact a driving surface while the vehicle 200 is in operation.

Further, the rear differential 208 may be selectively coupled and decoupled to the gearbox 210 and the front differential 206 via a connecting element 218, which may be a rear four-wheel-drive clutch or another suitable mechanism for selectively coupling the drive shaft 216 to an input shaft of the rear differential 208. The connecting element 218 may connect the rear differential to the drive shaft 216 during certain conditions such as braking maneuvers, which may allow the vehicle 200 to operate with standard front brakes. Without the ability to selectively couple and decouple the front and rear differentials from each other via the connecting element 218, the vehicle 200 may require much larger front brakes than those that are typically utilized. The connecting element 218 may decouple the rear differential 208 from the drive shaft 216 during other conditions, such as high vehicle speeds (e.g., above a threshold vehicle speed, such as above 30 mph). While FIG. 2 shows the gearbox 210 coupled to the front differential 206 with the connecting element 218 to selectively couple and decouple the rear differential 208, it should be appreciated that the gearbox could be coupled to the rear differential and the connecting element controlled to selectively couple and decouple the front differential instead, without departing from the scope of this disclosure.

The electric motor 202 may include components such as a rotor and a stator that electromagnetically interact during operation to generate motive power. Further, in one example, the electric motor 202 may be a motor-generator that is designed to generate electrical energy during regeneration operation and/or to implement a power takeoff 204 (e.g., an electric power takeoff) driven by a power takeoff shaft 214.

The first shaft of the gearbox 210 may be an input shaft (not shown) that is mechanically coupled (e.g., directly mechanically coupled) to a rotor shaft in the electric motor 202. In some examples, the first shaft may be directly coupled to the rotor shaft in the electric motor 202 via splines. In other examples, gears, shafts, chains, combinations thereof, and the like may be used to establish a connection between the gearbox 210 and the electric motor 202.

The second shaft of the gearbox 210 may be the power takeoff shaft 214 that is mechanically coupled (e.g., directly mechanically coupled) to the power takeoff 204. In some examples, the power takeoff 204 may be a joint that connects the power takeoff shaft 214 to a power takeoff implement (e.g., a mower). In other examples, the power takeoff 204 may be a mount (e.g., a coupling surface) for a power takeoff implement (e.g., a cooling fan). In still further examples, the power takeoff 204 may be a generator that is configured to generate electricity that is supplied to an external consumer, or the power takeoff 204 may have an electrical connection to the electric motor 202. The power takeoff 204 may also be referred to as a power takeoff unit.

The power takeoff shaft 214 may act as a second output shaft of the gearbox 210. In some examples, the power takeoff shaft 214 may be directly coupled to the power takeoff 204 via splines. In other examples, gears, shafts, chains, combinations thereof, and the like may be used to establish a connection between the power takeoff shaft 214 and the power takeoff 204. In some examples, the power takeoff shaft 214 may be a pass through shaft without a connection to any gear within the gearbox 210.

The electric motor 202 may spin a rotor shaft in opposing directions that correspond to forward and reverse drive. Therefore, in some examples, the gearbox 210 may be configured to operate with an equal number of forward and reverse driving gear modes. In other examples, the transmission may have an asymmetric number of selectable forward and reverse gear ratios.

FIG. 3 shows a schematic diagram of the gearbox 210, the electric motor 202, the power takeoff 204, the front differential 206, and the rear differential 208 of FIG. 2, each positioned within the vehicle 200 of FIG. 2. The electric motor 202, the power takeoff 204, and the front differential 206 may each be positioned on one side of the gearbox 210, relative to the x-axis, while the rear differential 208 may be positioned on the opposite side of the gearbox 210. Additionally, the electric motor 202 may be positioned above the power takeoff 204 and the front differential 206, relative to the y-axis.

The electric motor 202 may be mechanically coupled to the gearbox 210 via an input shaft 302. The power takeoff 204 may be mechanically coupled to the gearbox 210 via the power takeoff shaft 214. Further, the front differential 206 and the rear differential 208 may each be mechanically coupled to the gearbox 210 via an output shaft 332, which is a non-limiting example of the drive shaft 216 of FIG. 2.

The gearbox 210 may include a first gear set 306 comprising a first gear 308, a second gear 310, and a third gear 312, where the first gear 308 and the third gear 312 may each mesh with the second gear 310. The first gear 308 may be mounted on the input shaft 302 in such a way that, when engaged, the first gear 308 may rotate simultaneously with (e.g., in the same direction and at the same speed as) the input shaft 302. The second gear 310 may be mounted on a lay shaft 304 in such a way that the second gear 310 may rotate simultaneously with the lay shaft 304. The third gear 312 may be mounted on the output shaft 332 in such a way that the third gear 312 may rotate simultaneously with the output shaft 332. As such, the first gear set 306 may rotationally couple the input shaft 302, the lay shaft 304, and the output shaft 332 via the first gear 308, the second gear 310, and the third gear 312. In this way, the electric motor 202 may transmit torque to the output shaft 332 (e.g., via the first gear set 306) and may directly drive rotation of the front differential 206 and, when connected, the rear differential 208. The first gear set 306 may have a gear ratio that allows the electric motor 202 to be a high-speed motor, by converting the rotational speed of the input shaft 302 into a desired rotational speed range for the output shaft 332.

The gearbox 210 may include a first disconnect device 326, which may be a dog clutch, a synchronizer, a wet clutch, or another suitable device for connecting two shafts. The first disconnect device 326 may decouple the output shaft 332 from the input shaft 302 so that the input shaft 302 may rotate independently from the output shaft 332 and vice versa. In some examples, the first disconnect device 326 may decouple the output shaft 332 from the input shaft 302 when the electric motor 202 is operating at a rotational speed above a desired threshold, eliminating the need for the electric motor 202 to be oversized.

In some examples, as illustrated in FIG. 3, the first disconnect device 326 may be positioned to disconnect (e.g., to disengage) the first gear 308 from the input shaft 302. In other examples, the first disconnect device 326 may be positioned to disconnect (e.g., to disengage) the second gear 310 from the lay shaft 304. In still other examples, the first disconnect device 326 may be positioned to disconnect (e.g., to disengage) the third gear 312 from the output shaft 332.

The gearbox 210 may include a second gear set 314 comprising a fourth gear 316 and a fifth gear 318, where the fourth gear 316 may mesh with the fifth gear 318. The fourth gear 316 may be mounted on the input shaft 302 in such a way that, when engaged, the fourth gear 316 may rotate simultaneously with the input shaft 302. The fifth gear 318 may be mounted on the lay shaft 304 in such a way that the fifth gear 318 may rotate simultaneously with the lay shaft 304. As such, the second gear set 314 may rotationally couple the input shaft 302 and the lay shaft 304 via the fourth gear 316 and the fifth gear 318. Further, the fifth gear 318 may be rotationally coupled to the second gear 310 via the lay shaft 304. As such, the second gear set 314 may also rotationally couple the input shaft 302 and the output shaft 332 via the fourth gear 316, the fifth gear 318, the second gear 310, and the third gear 312. In this way, the electric motor 202 may transmit torque to the output shaft 332 (e.g., via the second gear set 314) and may drive rotation of the front differential 206 and, when connected, the rear differential 208.

The combination of the second gear set 314 and the first gear set 306 may allow the gearbox 210 to operate in multiple gear stages. To elaborate, FIG. 3 illustrates the gearbox 210 as a two-speed gearbox with two discrete gear stages. In some examples, the gearbox 210 may include additional gear stages, such as three or four gear stages, or may include a single gear stage. In some examples, the first disconnect device 326 may be a synchronizer and may allow the gearbox 210 to shift between gear stages.

In a first gear stage, the first disconnect device 326 may engage the first gear 308 with the input shaft 302 while the fourth gear 316 is disengaged from the input shaft 302. The input shaft 302 may then rotate separately from the fourth gear 316, and mechanical power (e.g., torque) may be transferred from the input shaft 302 to the output shaft 332 via the first gear set 306. In a second gear stage, the first disconnect device 326 may engage the fourth gear 316 with the input shaft 302 while the first gear 308 is disengaged from the input shaft 302. The input shaft 302 may then rotate separately from the first gear 308, and mechanical power (e.g., torque) may be transferred from the input shaft 302 to the output shaft 332 via the second gear set 314, the lay shaft 304, the second gear 310, and the third gear 312. The power path for each of the two gear stages is described with respect to FIGS. 6A and 6B.

The second gear set 314 may have a smaller gear ratio than the first gear set 306, and may allow the vehicle 200 to operate in four-wheel-drive at higher speeds (e.g., relative to the first gear set 306). Further, the first disconnect device 326 may enable a shift from the gearbox 210 operating with the first gear set 306 to the gearbox 210 operating with the second gear set 314 when the vehicle 200 is operating at or above a certain speed. Additionally, the first disconnect device 326 may be set in a neutral position where the first disconnect device 326 may disengage both the first gear 308 and the fourth gear 316 from the input shaft 302. The input shaft 302 may then rotate separately from the first gear 308 and the fourth gear 316, and mechanical power (e.g., torque) may not be transferred from the input shaft 302 to the output shaft 332. Front torque interruption during a shift in gear stages is supported by traction at the rear axle of the vehicle 200 and by active synchronization.

The gearbox 210 may include a third gear set 320 comprising a sixth gear 322 and a seventh gear 324, where the seventh gear 324 may mesh with the sixth gear 322. The sixth gear 322 may be mounted on the input shaft 302 in such a way that, when engaged, the sixth gear 322 may rotate simultaneously with the input shaft 302. The seventh gear 324 may be mounted on the power takeoff shaft 214 in such a way that, when engaged, the seventh gear 324 may rotate simultaneously with the power takeoff shaft 214. As such, the third gear set 320 may rotationally couple the input shaft 302 and the power takeoff shaft 214 via the sixth gear 322 and the seventh gear 324. In this way, the electric motor 202 may transmit torque to the power takeoff 204 via the third gear set 320 and the power takeoff shaft 214. Additionally, a secondary power source, such as a second electric motor, an internal combustion engine, or the drive wheels of the vehicle 200, may transmit torque to the electric motor 202 via the power takeoff shaft 214 or vice versa (e.g., the electric motor 202 may transmit torque to a crankshaft of the internal combustion engine). In some examples, a second power takeoff may be coupled to the secondary power source, such that the vehicle may have both a front power takeoff and a rear power takeoff. The third gear set 320 may have a gear ratio that allows the rotational speed of the electric motor 202 to drive rotation of the power takeoff shaft 214 within a desired rotational speed range.

The gearbox 210 may include a second disconnect device 328 and a third disconnect device 330, which may each be a dog clutch, a synchronizer, a wet clutch, or another suitable device for connecting two shafts. When the third disconnect device 330 is engaged (e.g., connected) and the second disconnect device 328 is disengaged (e.g., disconnected), the power takeoff 204 may be driven at varying speed by only the electric motor 202. When the second disconnect device 328 is engaged (e.g., connected) and the third disconnect device 330 is disengaged (e.g., disconnected), the electric motor 202 may act as a generator driven by a secondary power source via the power takeoff shaft 214. As such, the electric motor 202 may convert the mechanical energy of the rotation of the power takeoff shaft 214 into electrical energy. In some examples, the secondary power source may be a second electric motor, an internal combustion engine, or the drive wheels of the vehicle 200. When the electric motor 202 is operated as a generator, the electricity from the electric motor 202 may be stored in a battery and/or used to power an external consumer, such as electric power takeoff implement. In some examples, when the second disconnect device 328 is engaged and the third disconnect device 330 is disengaged, the electric motor 202 may transmit torque to the power takeoff shaft 214, which may then be used to drive a second power takeoff or generate electricity for an external consumer (e.g., the power takeoff shaft 214 may rotate the crankshaft of the internal combustion engine and an alternator coupled to the engine may generate the electricity).

The gearbox 210 may include a fourth disconnect device 336, which may be a dog clutch, a synchronizer, a wet clutch, or another suitable device for connecting two shafts. The fourth disconnect device 336 may allow the sixth gear 322 to disconnect from (e.g., to disengage) the input shaft 302. As such, the fourth disconnect device 336 may decouple the power takeoff shaft 214 from the input shaft 302. In this way, the input shaft 302 may rotate independently from the power takeoff shaft 214 and vice versa.

In some examples, the gearbox 210 may include the first gear set 306 and not include the second gear set 314 or the first disconnect device 326. In other examples, the gearbox 210 may include the first gear set 306 and the first disconnect device 326 and not include the second gear set 314. In still other examples, the gearbox 210 may include the first gear set 306, the second gear set 314, and the first disconnect device 326. In some examples, the gearbox 210 may not include the third gear set 320, the second disconnect device 328, or the third disconnect device 330. In other examples, the gearbox 210 may include the third gear set 320 and the second disconnect device 328 and not include the third disconnect device 330. In still other examples, the gearbox 210 may include the third gear set 320 and the third disconnect device 330 and not include the second disconnect device 328. Further, in other examples, the gearbox 210 may include the third gear set 320, the second disconnect device 328, and the third disconnect device 330.

FIG. 4 shows a second schematic diagram of the gearbox 210, the electric motor 202, the power takeoff 204, the front differential 206, and the rear differential 208 of FIG. 2, each positioned within the vehicle 200 of FIG. 2. However, the electric motor 202 may be positioned on the opposite side of the gearbox 210, relative to the x-axis, compared to the position of the electric motor 202 in FIG. 3. As such, the power takeoff 204 and the front differential 206 may each be positioned on one side of the gearbox 210, relative to the x-axis, while the electric motor 202 and the rear differential 208 may be positioned on the opposite side of the gearbox 210. In some examples, the position of the electric motor 202 as shown in FIG. 3 may better fulfill the packaging requirements of the vehicle 200. In other examples, the position of the electric motor 202 as shown in FIG. 4 may better fulfill the packaging requirements of the vehicle 200. When positioned as shown in FIG. 4, the electric motor 202 may still be mechanically coupled to the input shaft 302, as previously described. All other elements of the gearbox 210, the electric motor 202, the power takeoff 204, the front differential 206, and the rear differential 208 may be the same as described for FIG. 3.

Figure 5:
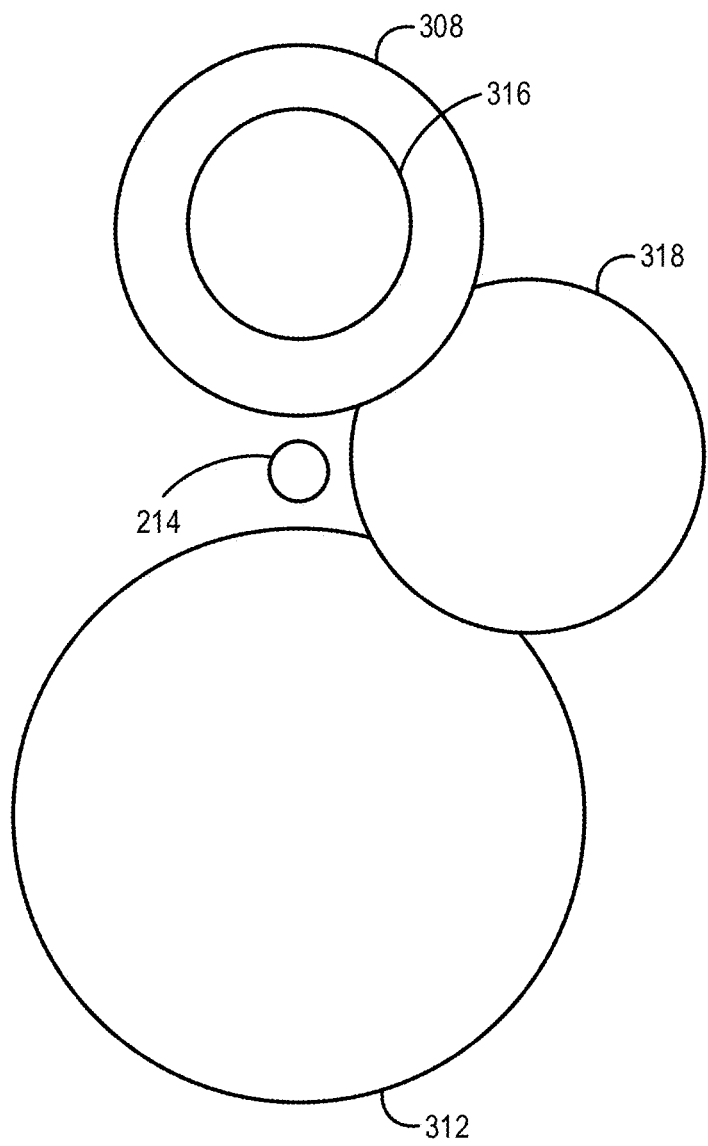
FIG. 5 is a schematic diagram of a plurality of gears of the gearbox of FIG. 2 and a power takeoff shaft.
Figure 5:
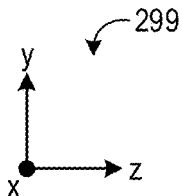

FIG. 5 shows a schematic diagram of the position of the power takeoff shaft 214 relative to one or more gears in each of the first gear set 306, the second gear set 314, and the third gear set 320. As illustrated, the first gear 308 and the fourth gear 316 may be positioned above the power takeoff shaft 214 and the third gear 312 may be positioned below the power takeoff shaft 214, relative to the y-axis. The fifth gear 318 may be positioned lateral to the power takeoff shaft 214, relative to the z-axis. Further, the second gear 310 may also be positioned lateral to the power takeoff shaft 214, relative to the z-axis, although the second gear 310 is hidden from view by the fifth gear 318 in this perspective. The positioning of the power takeoff shaft 214 and each of the first gear set 306, the second gear set 314, and the third gear set 320, as illustrated in FIG. 5, may allow for a compact design of a gearbox (e.g., the gearbox 210 of FIG. 2) by reducing the vertical distance (e.g., relative to the y-axis) between the power takeoff shaft 214 and the output shaft 332.

FIGS. 6A and 6B show a mechanical power path 600 and a mechanical power path 602 that occur in the gearbox 210 during operation in the first gear stage and the second gear stage, respectively. In each of FIGS. 6A and 6B, the electric motor 202 inputs mechanical power into the input shaft 302.

The mechanical power path 600 shown in FIG. 6A travels from the input shaft 302 to the first gear 308, from the first gear 308 to the second gear 310, from the second gear 310 to the third gear 312, and from the third gear 312 to the output shaft 332. From the output shaft 332, mechanical power is transferred to the front differential 206 and optionally the rear differential 208 (when the rear differential is coupled to the output shaft). The mechanical power path 600 may occur when the first disconnect device 326 engages the first gear 308 with the input shaft 302 and disengages the fourth gear 316 from the input shaft 302.

The mechanical power path 602 shown in FIG. 6B travels from the input shaft 302 to the fourth gear 316, from the fourth gear 316 to the fifth gear 318, from the fifth gear 318 to the lay shaft 304, from the lay shaft 304 to the second gear 310, from the second gear 310 to the third gear 312, and from the third gear 312 to the output shaft 332. From the output shaft 332, mechanical power is transferred to the front differential 206 and optionally the rear differential 208 (when the rear differential is coupled to the output shaft). The mechanical power path 602 may occur when the first disconnect device 326 disengages the first gear 308 from the input shaft 302 and engages the fourth gear 316 with the input shaft 302.

The first gear set 306 may transmit torque from the input shaft 302 to the output shaft 332 using a first gear ratio and the second gear set 314 may transmit torque from the input shaft 302 to the output shaft 332 using a second gear ratio that is different from the first gear ratio. For example, the first gear 308 may be larger than the fourth gear 316 (and the fifth gear 318 may be approximately the same size as the fourth gear 316) and the second gear 310 may be smaller than the first gear 308 and the fourth gear 316. As such, the gear ratio between the first gear 308 and the second gear 310 may be different than the gear ratio between the fourth gear 316 and the fifth gear 318, which may result in the first gear set 306 more efficiently transmitting torque at lower motor/input shaft speeds and the second gear set 314 more efficiently transmitting torque at higher motor/input shaft speeds. It should also be appreciated that when the first disconnect device 326 is disengaging both the first gear 308 and the fourth gear 316 from the input shaft 302, the drivetrain may operate in neutral where torque is not transmitted from the input shaft 302 to the output shaft 332.

Figure 7A:
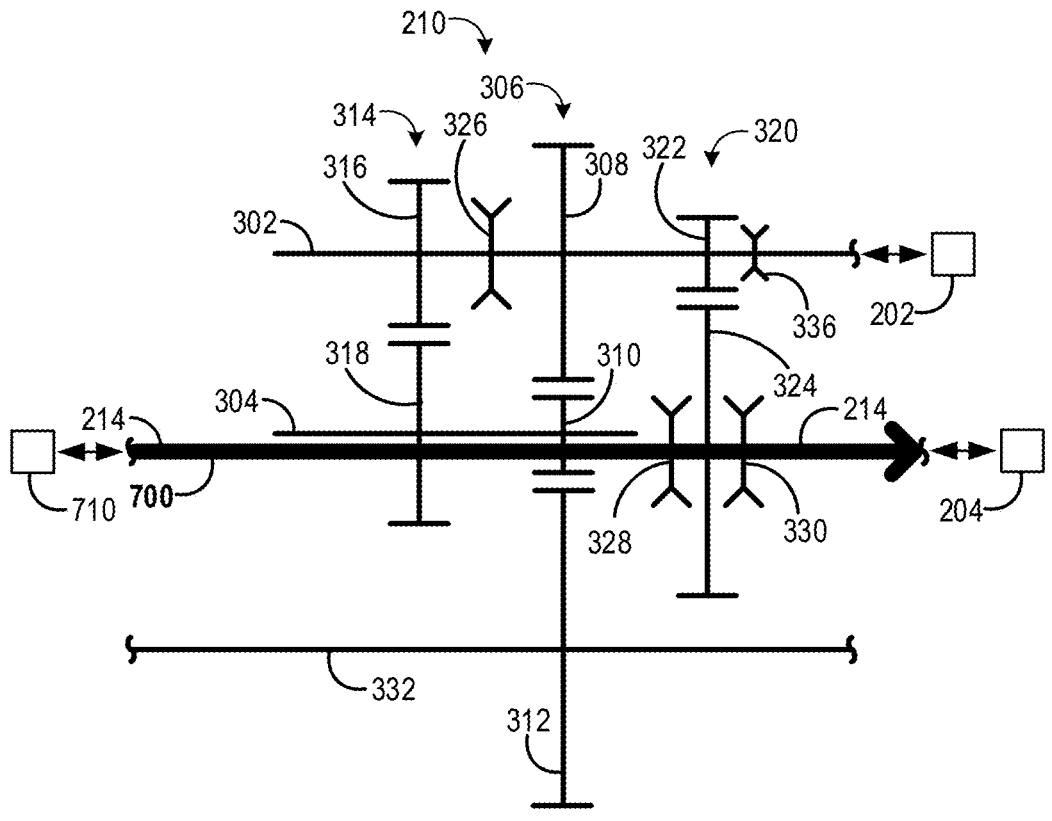
FIG. 7A is a schematic diagram of a power path that occurs in the gearbox of FIG. 2 when the power takeoff of FIG. 2 is driven by a secondary power source.

FIGS. 7A, 7B, 7C, and 7D each show mechanical power paths that occur in the gearbox 210 during different operational modes of the power takeoff 204. In FIG. 7A, the power takeoff 204 may not be connected to the electric motor 202. A secondary power source 710, such as a second electric motor, an internal combustion engine, or the drive wheels of the vehicle 200 of FIG. 2, inputs mechanical power into the power takeoff shaft 214. The mechanical power path 700 travels through the power takeoff shaft 214 and is transferred to the power takeoff 204. In some examples, the mechanical power path 700 may occur when the third gear set 320 is not included in the gearbox 210. In other examples, the mechanical power path 700 may occur when the fourth disconnect device 336 is disconnecting (e.g., is disengaging) the sixth gear 322 from the input shaft 302. In still other examples, the mechanical power path 700 may occur when the seventh gear 324 is not engaged with the power takeoff shaft 214.

Figure 7B:
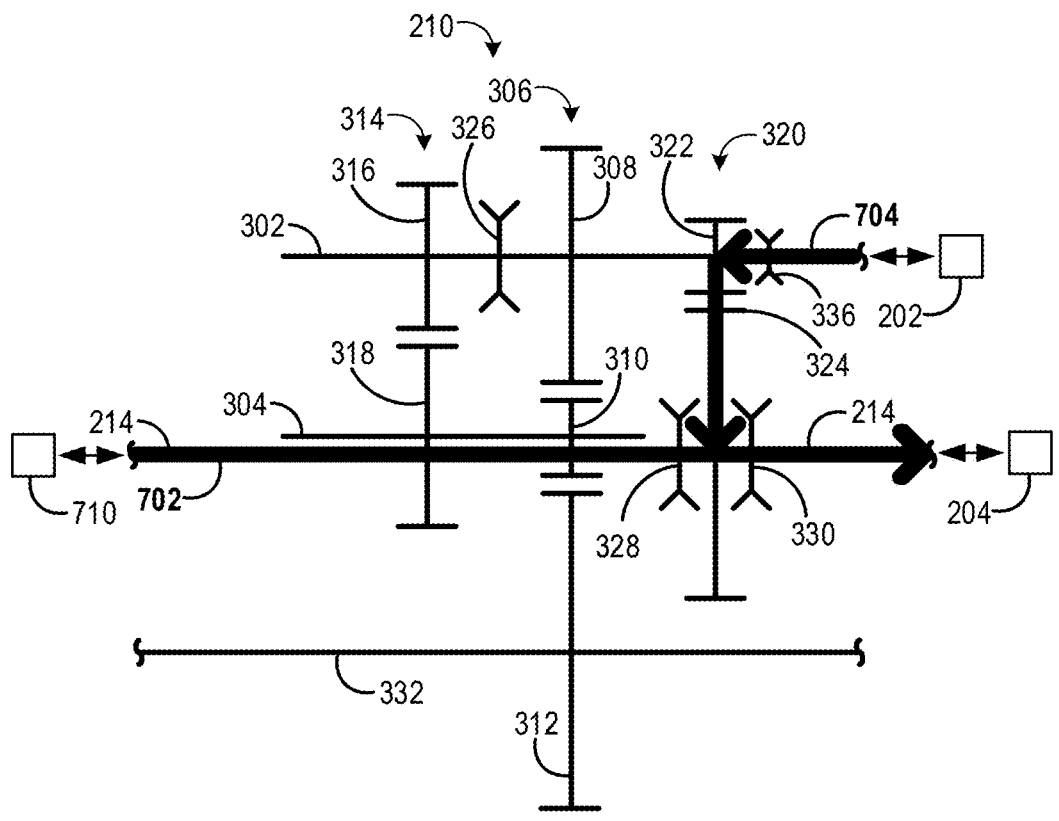
FIG. 7B is a schematic diagram of a power path that occurs in the gearbox of FIG. 2 when the power takeoff of FIG. 2 is driven by a secondary power source and the electric motor of FIG. 2.
Figure 8:
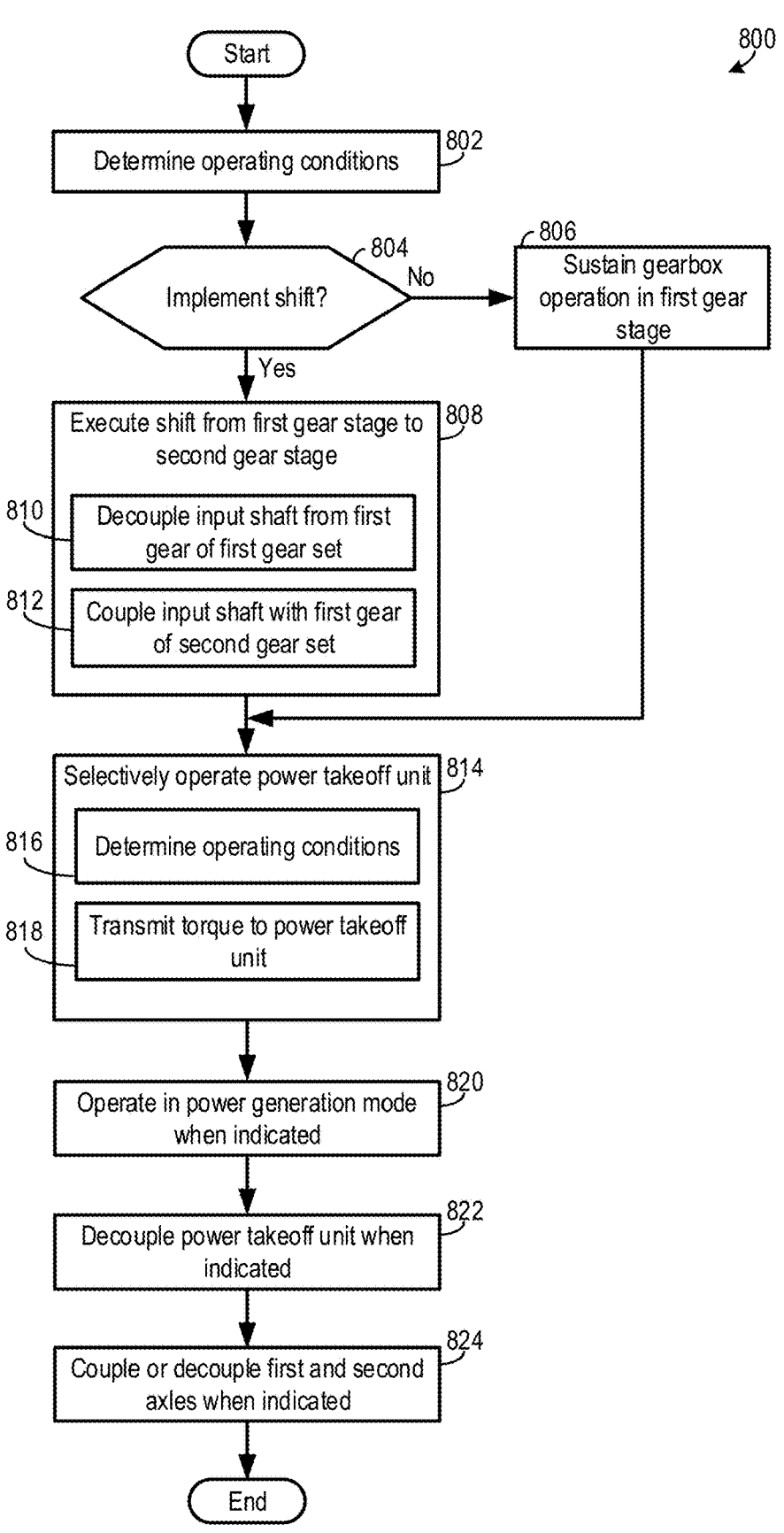
FIG. 8 shows a flow chart illustrating an example method for operating an electrified drivetrain.

In FIG. 7B, the power takeoff 204 may be in permanent or temporary connection with the electric motor 202. The secondary power source 710 inputs mechanical power into the power takeoff shaft 214. The mechanical power path 702 travels through the power takeoff shaft 214 and is transferred to the power takeoff 204. Additionally, the electric motor 202 inputs mechanical power into the input shaft 302. The mechanical power path 704 travels from the input shaft 302 to the sixth gear 322, from the sixth gear 322 to the seventh gear 324, and from the seventh gear 324 to the power takeoff shaft 214. From the power takeoff shaft 214, mechanical power is transferred to the power takeoff 204. In some examples, the mechanical power path 702 and the mechanical power path 704 may occur when the second disconnect device 328, the third disconnect device 330, and the fourth disconnect device 336 are not included in the gearbox 210. In other examples, the mechanical power path 702 and the mechanical power path 704 may occur when the second disconnect device 328 is not disconnected (e.g., is engaged), the third disconnect device 330 is not disconnected (e.g., is engaged), and the fourth disconnect device 336 is not disconnected (e.g., is engaged).

Figure 7C:
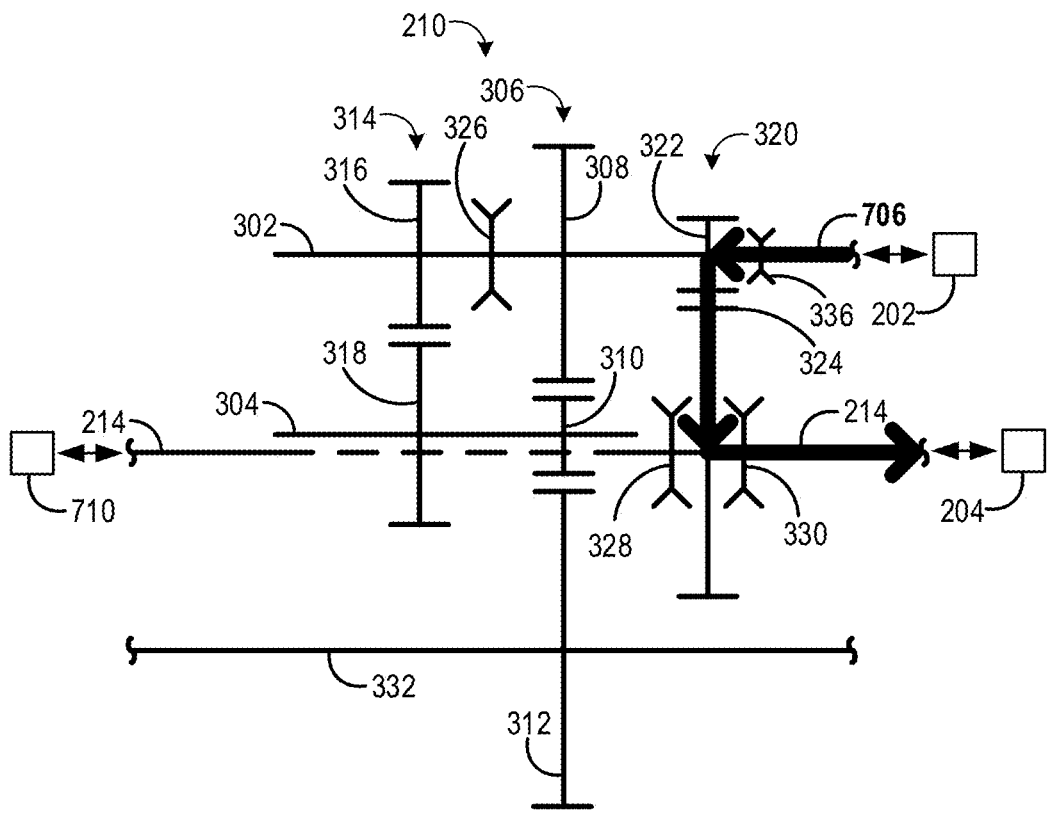
FIG. 7C is a schematic diagram of a power path that occurs in the gearbox of FIG. 2 when the power takeoff of FIG. 2 is driven by the electric motor of FIG. 2.

In FIG. 7C, the power takeoff 204 may be driven at varying speed by only the electric motor 202. The electric motor 202 inputs mechanical power into the input shaft 302. The mechanical power path 706 travels from the input shaft 302 to the sixth gear 322, from the sixth gear 322 to the seventh gear 324, and from the seventh gear 324 to the power takeoff shaft 214. From the power takeoff shaft 214, mechanical power is transferred to the power takeoff 204. The mechanical power path 706 may occur when the second disconnect device 328 is disconnected (e.g., is not engaged), the third disconnect device 330 is not disconnected (e.g., is engaged), and the fourth disconnect device 336 is not disconnected (e.g., is engaged). It is to be appreciated that the power takeoff shaft 214 may be comprised of a first half shaft and a second half shaft that are selectively coupled to each other via the second disconnect device 328, the seventh gear 324, and the third disconnect device 330. For example, the secondary power source 710 may be coupled to the first half shaft and the power takeoff 204 may be coupled to the second half shaft. When the second disconnect device 328 is not engaged, the first half shaft may be decoupled from the second half shaft to facilitate torque transfer from the input shaft 302 to the power takeoff 204 and not from the secondary power source 710 to the power takeoff 204.

Figure 7D:
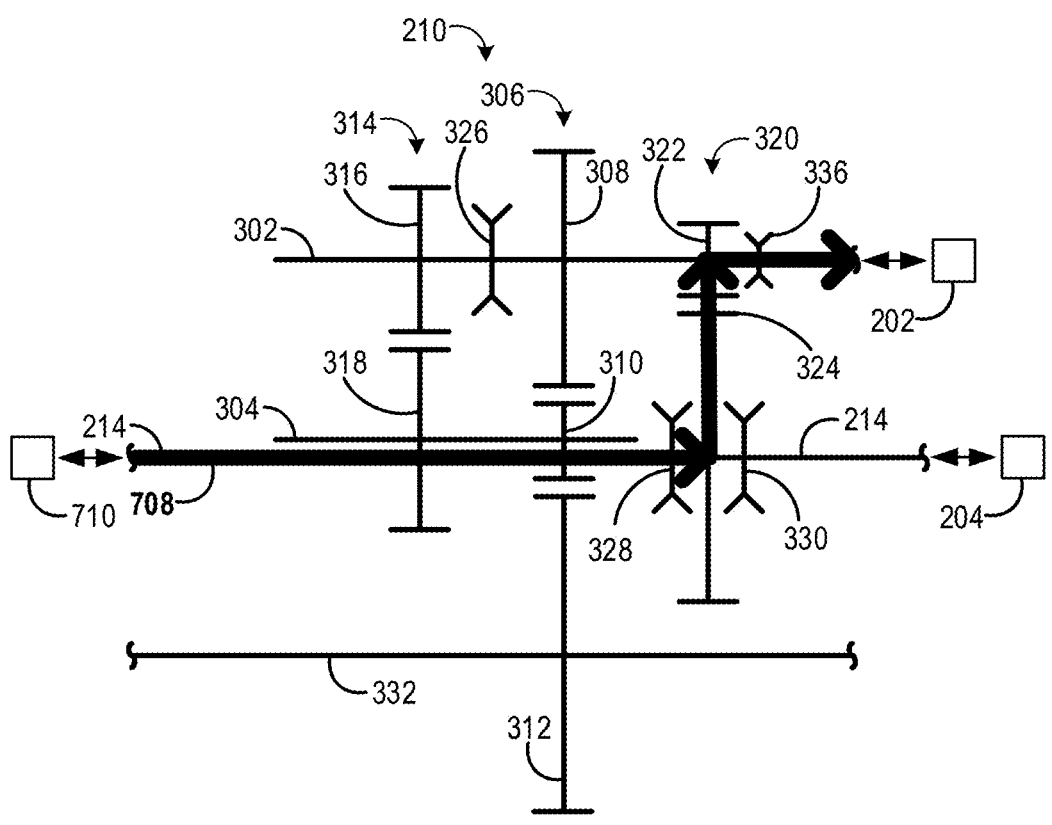
FIG. 7D is a schematic diagram of a power path that occurs in the gearbox of FIG. 2 when the electric motor of FIG. 2 is driven as a generator by a secondary power source.

In FIG. 7D, the electric motor 202 may act as a generator driven by the secondary power source 710. The secondary power source 710 inputs mechanical power into the power takeoff shaft 214. The mechanical power path 708 travels from the power takeoff shaft 214 to the seventh gear 324, from the seventh gear 324 to the sixth gear 322, and from the sixth gear 322 to the input shaft 302. From the input shaft 302, mechanical power in transferred to the electric motor 202 to be converted into electrical energy, which may be used to power an external consumer (e.g., an electric power takeoff implement). The mechanical power path 708 may occur when the second disconnect device 328 is not disconnected (e.g., is engaged), the third disconnect device 330 is disconnected (e.g., is not engaged), and the fourth disconnect device 336 is not disconnected (e.g., is engaged). When the third disconnect device 330 is not engaged, the first half shaft may be decoupled from the second half shaft to facilitate torque transfer from the secondary power source 710 to the input shaft 302 (and the electric motor 202) and not to the power takeoff 204. Further, while not shown in FIGS. 7A-7D, it is to be appreciated that if each of the second disconnect device 328, the third disconnect device 330, and the fourth disconnect device 336 are disengaged, torque transfer via the power takeoff system may be disabled as the input shaft 302 may be decoupled from the power takeoff shaft 214 (e.g., via the fourth disconnect device 336) and the first and second half shafts may each be decoupled from the third gear set 320 (e.g., via the second disconnect device 328 and the third disconnect device 330).

As mentioned above, in some examples, the power takeoff unit may be driven by a secondary power source, which may include an electric motor. FIGS. 9-12C show an embodiment of a vehicle including an electrified powertrain with a second electric motor to drive the power takeoff. In this way, the electric powertrain of FIGS. 9-12C includes two electric motors, where one electric motor is a traction motor to drive the wheels of the vehicle via a front and/or rear differential and the other electric motor drives the power takeoff unit and optionally a second power takeoff unit.

Turning first to FIG. 9, it shows another example of the vehicle 200 including a second electric motor 904 as a secondary power source for driving the power takeoff 204. To accommodate the second electric motor 904, the electric motor 202 may be positioned on the opposite side of the gearbox 210 from the second electric motor 904. Further, the gearbox 210 may be modified to include two separate input shafts, each coupled to a respective electric motor, as described in more detail below with respect to FIG. 10. The second electric motor 904 may be configured similarly to the electric motor 202, and as such may include components such as a rotor and a stator that electromagnetically interact during operation to generate motive power. Further, in some examples, the second electric motor 904 may be a motor-generator that is configured to generate electrical energy during regeneration operation. As will be explained in more detail with respect to FIG. 10, the electric motor 202 may be used to drive the front differential 206 and optionally the rear differential 208 via the drive shaft 216. The second electric motor 904 may be used to implement the power takeoff 204 (e.g., an electric power takeoff) driven by the power takeoff shaft 214.

In some examples, a rotor shaft of the second electric motor 904 may be directly coupled to the second input shaft of the gearbox 210 via splines. In other examples, gears, shafts, chains, combinations thereof, and the like may be used to establish a connection between the gearbox 210 and the second electric motor 904.

FIG. 10 shows a schematic diagram of the gearbox 210, the electric motor 202, the second electric motor 904, the power takeoff 204, the front differential 206, and the rear differential 208 of FIG. 9, each positioned within the vehicle 200. In the example shown in FIG. 10, vehicle 200 may further include a second power takeoff 1008. The second power takeoff 1008 may be a non-limiting example of the power takeoff 204 that is positioned at the rear of the vehicle 200.

The second electric motor 904, the power takeoff 204, and the front differential 206 may each be positioned on one side of the gearbox 210, relative to the x-axis, while the electric motor 202, the rear differential 208, and the second power takeoff 1008 may be positioned on the opposite side of the gearbox 210. Additionally, in some examples, the electric motor 202 may be positioned above the second power takeoff 1008 and the rear differential 208, and the second electric motor 904 may be positioned above the power takeoff 204 and the front differential 206, relative to the y-axis.

The electric motor 202 may be mechanically coupled to the gearbox 210 via a first input shaft 1002. The second electric motor 904 may be mechanically coupled to the gearbox 210 via a second input shaft 1004. The power takeoff 204 and the second power takeoff 1008 may each be mechanically coupled to the gearbox 210 via the power takeoff shaft 214. Further, the front differential 206 and the rear differential 208 may each be mechanically coupled to the gearbox 210 via an output shaft 332, which is a non-limiting example of the drive shaft 216 of FIG. 9.

The first input shaft 1002 may not be mechanically coupled to the second input shaft 1004. As such, the first input shaft 1002 may operate independently from the second input shaft 1004. Further, first input shaft 1002 may receive torque from a different source and transmit torque to one or more different components than the second input shaft 1004.

The gearbox 210 may include the first gear set 306 comprising the first gear 308, the second gear 310, and the third gear 312, which may be configured similarly to first gear set 306 of FIG. 3 and thus may rotationally couple the first input shaft 1002, the lay shaft 304, and the output shaft 332 via the first gear 308, the second gear 310, and the third gear 312. In this way, the electric motor 202 may transmit torque to the output shaft 332 (e.g., via the first gear set 306) and may directly drive rotation of the front differential 206 and, when connected, the rear differential 208. The first gear set 306 may have a gear ratio that allows the electric motor 202 to be a high-speed motor, by converting the rotational speed of the first input shaft 1002 into a desired rotational speed range for the output shaft 332.

The gearbox 210 may include the first disconnect device 326, which may be a dog clutch, a synchronizer, a wet clutch, or another suitable device for connecting two shafts, as explained above with respect to FIG. 3. The first disconnect device 326 may decouple the output shaft 332 from the first input shaft 1002 so that the first input shaft 1002 may rotate independently from the output shaft 332 and vice versa. In some examples, the first disconnect device 326 may decouple the output shaft 332 from the first input shaft 1002 when the electric motor 202 is operating at a rotational speed above a desired threshold.

The gearbox 210 may include the second gear set 314 comprising the fourth gear 316 and the fifth gear 318, which may rotationally couple the first input shaft 1002 and the lay shaft 304 via the fourth gear 316 and the fifth gear 318, similar to the second gear set 314 of FIG. 3. Further, the fifth gear 318 may be rotationally coupled to the second gear 310 via the lay shaft 304. As such, the second gear set 314 may also rotationally couple the first input shaft 1002 and the output shaft 332 via the fourth gear 316, the fifth gear 318, the second gear 310, and the third gear 312. In this way, the electric motor 202 may transmit torque to the output shaft 332 (e.g., via the second gear set 314) and may drive rotation of the front differential 206 and, when connected, the rear differential 208.

The combination of the second gear set 314 and the first gear set 306 may allow the gearbox 210 to operate in multiple gear stages, as explained above with respect to FIGS. 3 and 8. The power path for each of the two gear stages is described with respect to FIGS. 11A and 11B. The second gear set 314 may have a smaller gear ratio than the first gear set 306, and may allow the vehicle 200 to operate in four-wheel-drive at higher speeds (e.g., relative to the first gear set 306). Further, the first disconnect device 326 may enable a shift from the gearbox 210 operating with the first gear set 306 to the gearbox 210 operating with the second gear set 314 at when the vehicle 200 is operating at or above a certain speed. Additionally, the first disconnect device 326 may be set in a neutral position where the first disconnect device 326 may disengage both the first gear 308 and the fourth gear 316 from the first input shaft 1002. The first input shaft 1002 may then rotate separately from the first gear 308 and the fourth gear 316, and mechanical power (e.g., torque) may not be transferred from the first input shaft 1002 to the output shaft 332. Front torque interruption during a shift in gear stages is supported by traction at the rear axle of the vehicle 200 and by active synchronization.

The gearbox 210 may include a third gear set 320 comprising a sixth gear 322 and a seventh gear 324, where the seventh gear 324 may mesh with the sixth gear 322. The sixth gear 322 may be mounted on the second input shaft 1004 in such a way that, when engaged, the sixth gear 322 may rotate simultaneously with the second input shaft 1004. The seventh gear 324 may be mounted on the power takeoff shaft 214 in such a way that, when engaged, the seventh gear 324 may rotate simultaneously with the power takeoff shaft 214. As such, the third gear set 320 may rotationally couple the second input shaft 1004 and the power takeoff shaft 214 via the sixth gear 322 and the seventh gear 324. In this way, the second electric motor 904 may transmit torque to the power takeoff 204 and the second power takeoff 1008 via the third gear set 320 and the power takeoff shaft 214. The third gear set 320 may have a gear ratio that allows the rotational speed of the second electric motor 904 to drive rotation of the power takeoff shaft 214 and/or the second power takeoff 1008 within a desired rotational speed range.

The gearbox 210 may include the second disconnect device 328 and the third disconnect device 330, which may each be a dog clutch, a synchronizer, a wet clutch, or another suitable device for connecting two shafts. The power takeoff shaft 214 may be comprised of a first half shaft and a second half shaft that are selectively coupled to each other via the second disconnect device 328, the seventh gear 324, and the third disconnect device 330. For example, the second power takeoff 1008 may be coupled to the first half shaft and the power takeoff 204 may be coupled to the second half shaft. As such, the second disconnect device 328 and/or the third disconnect device 330 may be disengaged to decouple the first half shaft from the second half shaft.

When the second disconnect device 328 is disengaged (e.g., disconnected), the first half shaft may be decoupled from the second half shaft and the second electric motor 904 may not provide torque to the second power takeoff 1008. If the third disconnect device 330 is engaged (e.g., connected) while the second disconnect device 328 is disengaged, the power takeoff 204 may be driven at varying speed by the second electric motor 904. When the third disconnect device 330 is disengaged (e.g., disconnected), the second half shaft may be decoupled from the first half shaft and the second electric motor 904 may not provide torque to the power takeoff 204. If the second disconnect device 328 is engaged (e.g., connected) while the third disconnect device 330 is disengaged (e.g., disconnected), the second power takeoff 1008 may be driven at varying speed by the second electric motor 904.

The gearbox 210 may include the fourth disconnect device 336, which may be a dog clutch, a synchronizer, a wet clutch, or another suitable device for connecting two shafts. The fourth disconnect device 336 may allow the sixth gear 322 to disconnect from (e.g., to disengage) the second input shaft 1004. As such, the fourth disconnect device 336 may decouple the power takeoff shaft 214 from the second input shaft 1004. In this way, the second input shaft 1004 may rotate independently from the power takeoff shaft 214 and vice versa.

FIGS. 11A and 11B show mechanical power path 1100 and mechanical power path 1102 that occur in the gearbox 210 during operation in the first gear stage and the second gear stage, respectively. In each of FIGS. 11A and 11B, the electric motor 202 inputs mechanical power into the first input shaft 1002.

The mechanical power path 1100 shown in FIG. 11A travels from the first input shaft 1002 to the first gear 308, from the first gear 308 to the second gear 310, from the second gear 310 to the third gear 312, and from the third gear 312 to the output shaft 332. From the output shaft 332, mechanical power is transferred to the front differential 206 and optionally the rear differential 208 (when the rear differential is coupled to the output shaft). The mechanical power path 1100 may occur when the first disconnect device 326 engages the first gear 308 with the first input shaft 1002 and disengages the fourth gear 316 from the first input shaft 1002.

The mechanical power path 1102 shown in FIG. 11B travels from the first input shaft 1002 to the fourth gear 316, from the fourth gear 316 to the fifth gear 318, from the fifth gear 318 to the lay shaft 304, from the lay shaft 304 to the second gear 310, from the second gear 310 to the third gear 312, and from the third gear 312 to the output shaft 332. From the output shaft 332, mechanical power is transferred to the front differential 206 and optionally the rear differential 208 (when the rear differential is coupled to the output shaft). The mechanical power path 1102 may occur when the first disconnect device 326 disengages the first gear 308 from the first input shaft 1002 and engages the fourth gear 316 with the first input shaft 1002.

The first gear set 306 may transmit torque from the first input shaft 1002 to the output shaft 332 using first gear ratio and the second gear set 314 may transmit torque from the first input shaft 1002 to the output shaft 332 using a second gear ratio that is different from the first gear ratio. For example, the first gear 308 may be larger than the fourth gear 316 (and the fifth gear 318 may be approximately the same size as the fourth gear 316) and the second gear 310 may be smaller than the first gear 308 and the fourth gear 316. As such, the gear ratio between the first gear 308 and the second gear 310 may be different than the gear ratio between the fourth gear 316 and the fifth gear 318, which may result in the first gear set 306 more efficiently transmitting torque at lower motor/input shaft speeds and the second gear set 314 more efficiently transmitting torque at higher motor/input shaft speeds. It should also be appreciated that when the first disconnect device 326 is disengaging both the first gear 308 and the fourth gear 316 from the first input shaft 1002, the drivetrain may operate in neutral where torque is not transmitted from the first input shaft 1002 to the output shaft 332.

The mechanical power path 1100 and the mechanical power path 1102 may each occur independently from the mechanical power paths discussed in reference to FIGS. 12A-12C. As such, either the mechanical power path 1100 or the mechanical power path 1102 may occur at the same time as the mechanical power paths of FIGS. 12A-12C. Further, each of the mechanical power path 1100 and the mechanical power path 1102 may derive mechanical power from the electric motor 202, while the mechanical power paths of FIGS. 12A-12C may derive mechanical power from a secondary power source, such as the second electric motor 904. Each of the mechanical power path 1100 and the mechanical power path 1102 may output torque to the front differential 206 and/or the rear differential 208, while the mechanical power paths of FIGS. 12A-12C may output torque to the power takeoff 204 and/or the second power takeoff 1008.

FIGS. 12A, 12B, and 12C each show mechanical power paths that occur in the gearbox 210 during different operational modes of the power takeoff 204.

In FIG. 12A, the power takeoff 204 and the second power takeoff 1008 may be in permanent or temporary connection with the second electric motor 904. As such, both the power takeoff 204 and the second power takeoff 1008 may be driven at varying speed by the second electric motor 904. The second electric motor 904 inputs mechanical power into the second input shaft 1004. The mechanical power path 1202 travels from the second input shaft 1004 to the sixth gear 322, from the sixth gear 322 to the seventh gear 324, and from the seventh gear 324 to the power takeoff shaft 214. Mechanical power is transferred from the first half shaft of the power takeoff shaft 214 to the second power takeoff 1008. The mechanical power path 1204 travels from the second input shaft 1004 to the sixth gear 322, from the sixth gear 322 to the seventh gear 324, and from the seventh gear 324 to the power takeoff shaft 214. Mechanical power is transferred from the second half shaft of the power takeoff shaft 214 to the power takeoff 204.

In some examples, the mechanical power path 1202 and the mechanical power path 1204 may occur when the second disconnect device 328, the third disconnect device 330, and the fourth disconnect device 336 are not included in the gearbox 210. In other examples, the mechanical power path 1202 and the mechanical power path 1204 may occur when the second disconnect device 328 is not disconnected (e.g., is engaged), the third disconnect device 330 is not disconnected (e.g., is engaged), and the fourth disconnect device 336 is not disconnected (e.g., is engaged).

In FIG. 12B, the power takeoff 204 may be in permanent or temporary connection with the second electric motor 904.

As such, only the power takeoff 204 may be driven at varying speed by the second electric motor 904. The second electric motor 904 inputs mechanical power into the second input shaft 1004. The mechanical power path 1206 travels from the second input shaft 1004 to the sixth gear 322, from the sixth gear 322 to the seventh gear 324, and from the seventh gear 324 to the power takeoff shaft 214. Mechanical power is transferred from the second half shaft of the power takeoff shaft 214 to the power takeoff 204. The mechanical power path 1206 may occur when the second disconnect device 328 is disconnected (e.g., is not engaged), the third disconnect device 330 is not disconnected (e.g., is engaged), and the fourth disconnect device 336 is not disconnected (e.g., is engaged). When the second disconnect device 328 is not engaged, the first half shaft may be decoupled from the second half shaft and torque may not be transferred from the second input shaft 1004 to first half shaft of the power takeoff shaft 214 (e.g., to the second power takeoff 1008).

In FIG. 12C, the second power takeoff 1008 may be in permanent or temporary connection with the second electric motor 904. As such, only the second power takeoff 1008 may be driven at varying speed by the second electric motor 904. The second electric motor 904 inputs mechanical power into the second input shaft 1004. The mechanical power path 1206 travels from the second input shaft 1004 to the sixth gear 322, from the sixth gear 322 to the seventh gear 324, and from the seventh gear 324 to the power takeoff shaft 214. Mechanical power is transferred from the first half shaft of the power takeoff shaft 214 to the second power takeoff 1008. The mechanical power path 1208 may occur when the second disconnect device 328 is not disconnected (e.g., is engaged), the third disconnect device 330 is disconnected (e.g., is not engaged), and the fourth disconnect device 336 is not disconnected (e.g., is engaged). When the third disconnect device 330 is not engaged, the second half shaft may be decoupled from the first half shaft and torque may not be transferred from the second input shaft 1004 to second half shaft of the power takeoff shaft 214 (e.g., to the power takeoff 204).

Further, while not shown in FIGS. 12A-12C, it is to be appreciated that if each of the second disconnect device 328, the third disconnect device 330, and the fourth disconnect device 336 are disengaged, torque transfer via the power takeoff system may be disabled as the second input shaft 1004 may be decoupled from the power takeoff shaft 214 (e.g., via the fourth disconnect device 336) and the first and second half shafts may each be decoupled from the third gear set (e.g., via the second disconnect device 328 and the third disconnect device 330).

FIG. 8 shows a method 800 for operating an electrified drivetrain of a vehicle, such as the vehicle including the gearbox 210 of FIG. 2 or FIG. 9. Further, the method 800 may be implemented by a controller (e.g., controller 126) that includes memory holding instructions for the method steps that are executable by a processor. The method 800 may be carried out when gearbox is operating in a first gear stage, where the first gear stage utilizes a first gear set to transmit torque from an input shaft coupled to an electric motor to an output shaft coupled to a first axle and/or a second axle of the vehicle.

At 802, the method 800 includes determining the operating conditions of the vehicle. The operating conditions may include input device position (e.g., gearshift lever position), clutch configuration, accelerator pedal position, gearbox input/output speed, motor speed, vehicle speed, vehicle load, ambient temperature, and the like. The operating conditions may be ascertained via sensor inputs, modeling, look-up tables, and/or other suitable techniques.

At 804, the method 800 determines if a shift from the first gear stage to a second gear stage should be implemented. In some examples, this determination may be automatically carried out responsive to the rotational speed of an input shaft of the gearbox meeting a predetermined condition relative to a threshold value (e.g., a threshold rotational speed). For example, the determination to shift to the second gear stage may be in response to the input shaft speed/motor speed exceeding a threshold speed. In other examples, operator interaction with gear selector may initiate the upshift.

If it is determined that a shift from the first gear stage to the second gear stage should not occur (No at 804), then the method 800 proceeds to 806. At 806, the method 800 includes sustaining the gearbox operation in the first gear stage.

If it is determined that a shift from the first gear stage to the second gear stage should occur (Yes at 804), then the method 800 proceeds to 808. At 808, the method 800 includes executing a shift from the first gear stage to the second gear stage.

Executing a shift from the first gear stage to the second gear stage may include, as indicated at 810, decoupling the input shaft from a first gear of the first gear set (e.g., first gear 308). The input shaft may be decoupled from the first gear of the first gear set via a first disconnect device (e.g., first disconnect device 326). Executing the shift from the first gear stage to the second gear stage may include, as indicated at 812, coupling the input shaft with a first gear of a second gear set (e.g., fourth gear 316). The input shaft may be coupled to the first gear of the second gear set via the first disconnect device. During the shift from the first gear stage to the second gear stage, active synchronization may be performed, which may include controlling the speed of the electric motor to adjust the rotational speed of the input shaft so that the rotational speed of the input shaft matches the rotational speed of the first gear of the second gear set when the input shaft is coupled to the first gear of the second gear set.

In some examples, the first disconnect device may decouple the input shaft from both the first gear of the first gear set and the first gear of the second gear set at the same time. During this time, torque may not be transferred from the input shaft to an output shaft of the gearbox, and the electrified drivetrain of the vehicle may be operating in a neutral stage. In some examples, the drivetrain may be operated in neutral in response to an operator request (e.g., a shift of the gear selector to neutral).

At 814, the method 800 includes selectively operating a power takeoff unit. Selectively operating the power takeoff unit may include, as indicated at 816, determining the operating conditions of the vehicle. The operating conditions may include input device position (e.g., power takeoff lever position), clutch configuration, accelerator pedal position, gearbox input/output speed, motor speed, vehicle speed, vehicle load, ambient temperature, and the like. The operating conditions may be ascertained via sensor inputs, modeling, look-up tables, and/or other suitable techniques. In some examples, the operating conditions may be used to determine if a request to operate the power takeoff unit. In other examples, the operating conditions may be used to determine if regeneration conditions have been met.

Selectively operating the power takeoff unit may further include, as indicated at 818, transmitting torque to the power take off unit (e.g., power takeoff 204). Torque may be transmitted to the power take off unit from an input shaft of the gearbox and/or from a secondary power source via a power takeoff shaft (e.g., power takeoff shaft 214) and a third gear set. The power takeoff shaft may comprise a first half shaft and a second half shaft. In some examples, torque may be transmitted from the input shaft to the second half shaft by decoupling the first half shaft from the third gear set via a second disconnect device (e.g., second disconnect device 328) and coupling the input shaft to the second half shaft via the third gear set coupled to the second half shaft by a third disconnect device (e.g., third disconnect device 330). In other examples, torque may be transmitted from the secondary power source to the second half shaft by coupling the first half shaft to the second half shaft via the third gear set and the second disconnect device, and decoupling the input shaft from the second half shaft via the third disconnect device. In still other examples, torque may be transmitted from both the input shaft and the secondary power source to the second half shaft by coupling the first half shaft to the second half shaft via the third gear set and the second disconnect device, and coupling the input shaft to the second half shaft via the third disconnect device.

In some examples, selectively operating the power takeoff unit may include transmitting torque to the power takeoff unit and/or a second power takeoff unit (e.g., the second power takeoff 1008) from a second input shaft (e.g., the second input shaft 1004) of the gearbox via the power takeoff shaft and the third gear set. The second input shaft may be coupled to a secondary power source, such as a second electric motor (e.g., the second electric motor 904). Torque that is transferred from the second input shaft to the power takeoff unit and/or the second power takeoff unit may be supplied by the secondary power source. In some examples, torque may be transmitted from the second input shaft to only the second half shaft of the power takeoff shaft by decoupling the first half shaft from the third gear set via the second disconnect device and coupling the second half shaft to the third gear set via the third disconnect device. From the second half shaft, torque may be transferred to the power takeoff unit. In other examples, torque may be transmitted from the second input shaft to only the first half shaft of the power takeoff shaft by coupling the first half shaft to the third gear set via the second disconnect device and decoupling the second half shaft from the third gear set via the third disconnect device. From the first half shaft, torque may be transferred to the second power takeoff unit. In still other examples, torque may be transmitted from the second input shaft to both the first half shaft and the second half shaft by coupling the first half shaft to the third gear set via the second disconnect device and coupling the second half shaft to the third gear set via the third disconnect device. From the first half shaft and the second half shaft, torque may be transferred to the second power takeoff unit and the power takeoff unit, respectively.

At 820, method 800 includes operating in a power generation mode when indicated. The power generation mode may include transmitting torque from the secondary power source to the electric motor in order to operate the electric motor as a generator and regenerate electricity for storage in the battery of the vehicle and/or for operating an electric consumer, such as an electric power takeoff implement. The vehicle may be operated in the power generation mode when torque from the electric motor is not needed to propel the vehicle (e.g., during a deceleration event) and/or when a state of charge of the battery is below a threshold level. If generation conditions have been met, torque may be transmitted from the secondary power source to the electric motor via the third gear set, by coupling the first half shaft to the input shaft via the second disconnect device and third gear set and decoupling the second half shaft from the first half shaft and third gear set via the third disconnect device.

At 822, method 800 includes decoupling the power takeoff unit when indicated. When operation of the power takeoff unit is not requested and when the vehicle is not operating in the power generation mode, the power takeoff unit may be decoupled from the drivetrain. Decoupling the power takeoff unit may include decoupling the first half shaft from the second half shaft via the second disconnect device and the third disconnect device and decoupling the input shaft from the third gear set via a fourth disconnect device.

At 824, method 800 includes coupling or decoupling a first axle of the vehicle from a second axle of the vehicle when indicated. The first axle may be the front axle and the second axle may be the rear axle. Decoupling or coupling the first and second axles may include engaging or disengaging a connecting element (e.g., a clutch) coupling the second axle to the output shaft (e.g., connecting element 218). For example, during vehicle braking, the connecting element may be adjusted to couple the second axle to the first axle via the output shaft. During high speed operation (e.g., where the input shaft is operating at a relatively high speed), the connecting element may be adjusted to decouple the second axle from the first axle.

During execution of method 800, in some examples, one electric motor may be controlled to operate at a speed to deliver the requested torque for propelling the vehicle (e.g., via the output shaft) and/or powering the power takeoff unit (e.g., via the power takeoff shaft). In other examples, a first electric motor may be controlled to operate at a speed to deliver the requested torque for propelling the vehicle (e.g., via the output shaft) and a second electric motor may be controlled to operate at a speed to power the power takeoff unit (e.g., via the power takeoff shaft). During the power generation mode, one or more electric motors may be operated as a generator and thus the speed control of the one or more electric motors may be disabled. Further, during certain conditions when operation of an electric motor is not requested, such as when the drivetrain is operated in the neutral stage or otherwise the electric motor is not transmitting torque to the output shaft (e.g., during high vehicle speed conditions), the electric motor may be controlled to operate with a speed of zero or a relatively low speed, which may reduce the amount of energy consumed by the electric motor.

FIGS. 2-12C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The disclosure also provides support for a gearbox for a vehicle, comprising: a first gear coupled to a first input shaft, the first input shaft configured to be driven by a first electric motor of the vehicle, a second gear configured to mesh with the first gear, a third gear configured to mesh with the second gear and coupled to a third shaft, the third shaft configured to drive a first axle of the vehicle and connectable to a second axle of the vehicle, wherein the first gear, the second gear, and the third gear form a first gear set, a second gear set comprising a fourth gear coupled to the first input shaft and a fifth gear coupled to a lay shaft, the lay shaft coupled to the second gear, and a third gear set comprising a sixth gear coupled to a second input shaft and a seventh gear coupled to a power takeoff shaft, the power takeoff shaft configured to drive one or more power takeoff units, the second input shaft configured to be driven by a second electric motor. In a first example of the gearbox, the gearbox further comprises: a first disconnect device configured to selectively couple and decouple the first gear to the first input shaft. In a second example of the gearbox, optionally including the first example, the first disconnect device is configured to selectively couple and decouple the fourth gear to the first input shaft. In a third example of the gearbox, optionally including one or both of the first and second examples, the first gear set is configured to transfer torque from the first input shaft to the third shaft with a first gear ratio, and wherein the second gear set is configured to transfer torque from the first input shaft to the third shaft with a second gear ratio, different than the first gear ratio. In a fourth example of the gearbox, optionally including one or more or each of the first through third examples, the power takeoff shaft comprises a first half shaft coupled to a first power takeoff unit of the one or more power takeoff units and a second half shaft coupled to a second power takeoff unit of the one or more power takeoff units, the first half shaft couplable to the second half shaft at the seventh gear. In a fifth example of the gearbox, optionally including one or more or each of the first through fourth examples, the gearbox further comprises one or more of: a second disconnect device configured to selectively couple and decouple the seventh gear to the first half shaft, a third disconnect device configured to selectively couple and decouple the seventh gear to the second half shaft, and a fourth disconnect device configured to selectively couple and decouple the sixth gear from the second input shaft.

The disclosure also provides support for a method for an electrified drivetrain of a vehicle, comprising: operating the electrified drivetrain in a first gear stage, including transmitting torque from a first input shaft coupled to an electric motor to an output shaft via a first gear set, the output shaft coupled to a first axle and/or a second axle, determining that a speed of the first input shaft has met a predetermined condition relative to a threshold, and in response, shifting from the first gear stage to a second gear stage and operating the electrified drivetrain in the second gear stage, including transmitting torque from the first input shaft to the output shaft via a second gear set, and determining that a request to operate a power takeoff unit has been received, and in response, transmitting torque from the first input shaft and/or from a secondary power source to the power takeoff unit via a power takeoff shaft and a third gear set, wherein the power takeoff shaft comprises a first half shaft and a second half shaft and wherein transmitting torque from the first input shaft and/or from the secondary power source to the power takeoff unit via the power takeoff shaft and the third gear set comprises transmitting torque from the secondary power source to the power takeoff unit via the second half shaft by decoupling the first half shaft from the third gear set via a first disconnect device and coupling a second input shaft to the second half shaft via the third gear set coupled to the second half shaft by a second disconnect device, the second input shaft driven by the secondary power source, the second half shaft coupled to the power takeoff unit. In a first example of the method, shifting from the first gear stage to the second gear stage comprises decoupling the first input shaft from a first gear of the first gear set and coupling the first input shaft to the second gear set via a third disconnect device. In a second example of the method, optionally including the first example, the method further comprises: operating the electrified drivetrain in a neutral stage where torque from the first input shaft is not transmitted to the output shaft and the third disconnect device decouples the first input shaft from the first gear set and from the second gear set. In a third example of the method, optionally including one or both of the first and second examples, the method further comprises, while shifting from the first gear stage to the second gear stage, controlling a speed of the electric motor to synchronize a speed of the first input shaft to a speed of the second gear set. In a fourth example of the method, optionally including one or more or each of the first through third examples, the method further comprises: reducing a speed of the electric motor during operation of the electrified drivetrain in a neutral stage. In a fifth example of the method, optionally including one or more or each of the first through fourth examples, the power takeoff unit is a first power takeoff unit, and further comprising transmitting torque from the secondary power source to a second power takeoff unit via the first half shaft by decoupling the second half shaft from the third gear set via the second disconnect device and coupling the second input shaft to the first half shaft via the third gear set coupled to the first half shaft by the first disconnect device, the first half shaft coupled to the second power takeoff unit. In a sixth example of the method, optionally including one or more or each of the first through fifth examples, the method further comprises: transmitting torque from the secondary power source to both the first power takeoff unit and the second power takeoff unit via the first half shaft and the second half shaft each coupled to the third gear set via the first disconnect device and the second disconnect device.

The disclosure also provides support for an electrified drivetrain for a vehicle, comprising: a first input shaft configured to be driven by a first electric motor, a second input shaft configured to be driven by a second electric motor, a power takeoff shaft configured to be driven by the second electric motor, an output shaft coupled to a front differential and/or a rear differential, and a gearbox including a first gear set and a second gear set each coupling the first input shaft to the output shaft and a third gear set coupling the second input shaft to the power takeoff shaft. In a first example of the drivetrain, the first gear set comprises a first gear, a second gear, and a third gear, the second gear meshing with the first gear and the third gear, and wherein the second gear set comprises a fourth gear that meshes with a fifth gear, the fifth gear coupled to a lay shaft, the lay shaft coupled to the second gear. In a second example of the drivetrain, optionally including the first example, the first gear and the second gear have a first gear ratio and the fourth gear and the fifth gear have a second gear ratio, different than the first gear ratio. In a third example of the drivetrain, optionally including one or both of the first and second examples, the third gear set comprises a sixth gear coupled to the second input shaft and a seventh gear coupled to the power takeoff shaft. In a fourth example of the drivetrain, optionally including one or more or each of the first through third examples, the power takeoff shaft comprises a first half shaft coupled to a first power takeoff unit and a second half shaft coupled to a second power takeoff unit, the first half shaft couplable to the second half shaft at the seventh gear. In a fifth example of the drivetrain, optionally including one or more or each of the first through fourth examples, the drivetrain further comprises: a first disconnect device configured to selectively decouple the output shaft from the first input shaft via the first gear set. In a sixth example of the drivetrain, optionally including one or more or each of the first through fifth examples, the first disconnect device is further configured to selectively couple and decouple the second gear set to the output shaft.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A gearbox for a vehicle, comprising:
a first gear coupled to a first input shaft, the first input shaft configured to be driven by a first electric motor of the vehicle;
a second gear configured to mesh with the first gear;
a third gear configured to mesh with the second gear and coupled to a third shaft, the third shaft configured to drive a first axle of the vehicle and connectable to a second axle of the vehicle, wherein the first gear, the second gear, and the third gear form a first gear set;
a second gear set comprising a fourth gear coupled to the first input shaft and a fifth gear coupled to a lay shaft, the lay shaft coupled to the second gear; and
a third gear set comprising a sixth gear coupled to a second input shaft and a seventh gear coupled to a power takeoff shaft, the power takeoff shaft configured to drive one or more power takeoff units, the second input shaft configured to be driven by a second electric motor.

2. The gearbox of claim 1, further comprising a first disconnect device configured to selectively couple and decouple the first gear to the first input shaft.

3. The gearbox of claim 2, wherein the first disconnect device is configured to selectively couple and decouple the fourth gear to the first input shaft.

4. The gearbox of claim 1, wherein the first gear set is configured to transfer torque from the first input shaft to the third shaft with a first gear ratio, and wherein the second gear set is configured to transfer torque from the first input shaft to the third shaft with a second gear ratio, different than the first gear ratio.

5. The gearbox of claim 1, wherein the power takeoff shaft comprises a first half shaft coupled to a first power takeoff unit of the one or more power takeoff units and a second half shaft coupled to a second power takeoff unit of the one or more power takeoff units, the first half shaft couplable to the second half shaft at the seventh gear.

6. The gearbox of claim 5, further comprising one or more of:
a second disconnect device configured to selectively couple and decouple the seventh gear to the first half shaft;
a third disconnect device configured to selectively couple and decouple the seventh gear to the second half shaft; and a fourth disconnect device configured to selectively couple and decouple the sixth gear from the second input shaft.

7. A method for an electrified drivetrain of a vehicle, comprising:

operating the electrified drivetrain in a first gear stage, including transmitting torque from a first input shaft coupled to an electric motor to an output shaft via a first gear set, the output shaft coupled to a first axle and/or a second axle;

determining that a speed of the first input shaft has met a predetermined condition relative to a threshold, and in response, shifting from the first gear stage to a second gear stage and operating the electrified drivetrain in the second gear stage, including transmitting torque from the first input shaft to the output shaft via a second gear set; and determining that a request to operate a power takeoff unit has been received, and in response, transmitting torque from the first input shaft and/or from a secondary power source to the power takeoff unit via a power takeoff shaft and a third gear set, wherein the power takeoff shaft comprises a first half shaft and a second half shaft and wherein transmitting torque from the first input shaft and/or from the secondary power source to the power takeoff unit via the power takeoff shaft and the third gear set comprises transmitting torque from the secondary power source to the power takeoff unit via the second half shaft by decoupling the first half shaft from the third gear set via a first disconnect device and coupling a second input shaft to the second half shaft via the third gear set coupled to the second half shaft by a second disconnect device, the second input shaft driven by the secondary power source, the second half shaft coupled to the power takeoff unit.

8. The method of claim 7, wherein shifting from the first gear stage to the second gear stage comprises decoupling the first input shaft from a first gear of the first gear set and coupling the first input shaft to the second gear set via a third disconnect device.

9. The method of claim 8, further comprising operating the electrified drivetrain in a neutral stage where torque from the first input shaft is not transmitted to the output shaft and the third disconnect device decouples the first input shaft from the first gear set and from the second gear set.

10. The method of claim 7, further comprising, while shifting from the first gear stage to the second gear stage, controlling a speed of the electric motor to synchronize a speed of the first input shaft to a speed of the second gear set.

11. The method of claim 7, further comprising reducing a speed of the electric motor during operation of the electrified drivetrain in a neutral stage.

12. The method of claim 7, wherein the power takeoff unit is a first power takeoff unit, and further comprising transmitting torque from the secondary power source to a second power takeoff unit via the first half shaft by decoupling the second half shaft from the third gear set via the second disconnect device and coupling the second input shaft to the first half shaft via the third gear set coupled to the first half shaft by the first disconnect device, the first half shaft coupled to the second power takeoff unit.

13. The method of claim 12, further comprising transmitting torque from the secondary power source to both the first power takeoff unit and the second power takeoff unit via the first half shaft and the second half shaft each coupled to the third gear set via the first disconnect device and the second disconnect device.

14. An electrified drivetrain for a vehicle, comprising:

a first input shaft configured to be driven by a first electric motor;

a second input shaft configured to be driven by a second electric motor;

a power takeoff shaft configured to be driven by the second electric motor;

an output shaft coupled to a front differential and/or a rear differential;

a gearbox including a first gear set and a second gear set each coupling the first input shaft to the output shaft and a third gear set coupling the second input shaft to the power takeoff shaft; and a first disconnect device configured to selectively decouple the output shaft from the first input shaft via the first gear set.

15. The electrified drivetrain of claim 14, wherein the first gear set comprises a first gear, a second gear, and a third gear, the second gear meshing with the first gear and the third gear, and wherein the second gear set comprises a fourth gear that meshes with a fifth gear, the fifth gear coupled to a lay shaft, the lay shaft coupled to the second gear.

16. The electrified drivetrain of claim 15, wherein the first gear and the second gear have a first gear ratio and the fourth gear and the fifth gear have a second gear ratio, different than the first gear ratio.

17. The electrified drivetrain of claim 15, wherein the third gear set comprises a sixth gear coupled to the second input shaft and a seventh gear coupled to the power takeoff shaft.

18. The electrified drivetrain of claim 17, wherein the power takeoff shaft comprises a first half shaft coupled to a first power takeoff unit and a second half shaft coupled to a second power takeoff unit, the first half shaft couplable to the second half shaft at the seventh gear.

19. The electrified drivetrain of claim 14, wherein the first disconnect device is further configured to selectively couple and decouple the second gear set to the output shaft.

* * * * *